United States Patent [19]
Aoki

[11] Patent Number: 6,064,317
[45] Date of Patent: *May 16, 2000

[54] DATA COMMUNICATION SYSTEM AND DATA COMMUNICATION TERMINAL APPLIED THERETO

[75] Inventor: Yoichi Aoki, Ichikawa, Japan

[73] Assignee: Casio Computer Co., Ltd., Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 09/121,513

[22] Filed: Jul. 23, 1998

Related U.S. Application Data

[63] Continuation of application No. 08/576,484, Dec. 21, 1995.

[30] Foreign Application Priority Data

Dec. 27, 1994 [JP] Japan .................................. 6-325118

[51] Int. Cl.⁷ ................................ H04Q 7/00; G08B 5/00
[52] U.S. Cl. ............................... 340/825.44; 340/825.47; 340/825.52; 379/90.01
[58] Field of Search ...................... 340/825.44, 825.47, 340/825.52, 825.08, 825.54; 379/90.01

[56] References Cited

U.S. PATENT DOCUMENTS

| | | | |
|---|---|---|---|
| 4,646,081 | 2/1987 | Tsunoda | 340/825.44 |
| 4,799,254 | 1/1989 | Dayton et al. | 379/97 |
| 4,811,379 | 3/1989 | Grandfield | 379/57 |
| 5,095,307 | 3/1992 | Shimura et al. | 340/825.44 |
| 5,153,582 | 10/1992 | Davis | 340/825.44 |
| 5,204,768 | 4/1993 | Tsakiris et al. | 359/148 |
| 5,583,921 | 12/1996 | Hidaka | 379/93 |

FOREIGN PATENT DOCUMENTS

WO 94/11960  5/1994  WIPO .

Primary Examiner—William A. Cuchlinski, Jr.
Assistant Examiner—Yonel Beaulieu
Attorney, Agent, or Firm—Frishauf, Holtz, Goodman, Langer & Chick, P.C.

[57] ABSTRACT

A communication system is designed to exchange messages between a plurality of paging receivers each having a transmission section. One of the paging receivers transmits a question message and a plurality of answer contents to the question message to a paging receiver group constituted by the remaining paging receivers. When answer messages are returned from the paging receiver group which has received the question message and the answer contents, the paging receiver totalizes the answer messages, and displays them on a liquid crystal display panel, together with the question message.

14 Claims, 31 Drawing Sheets

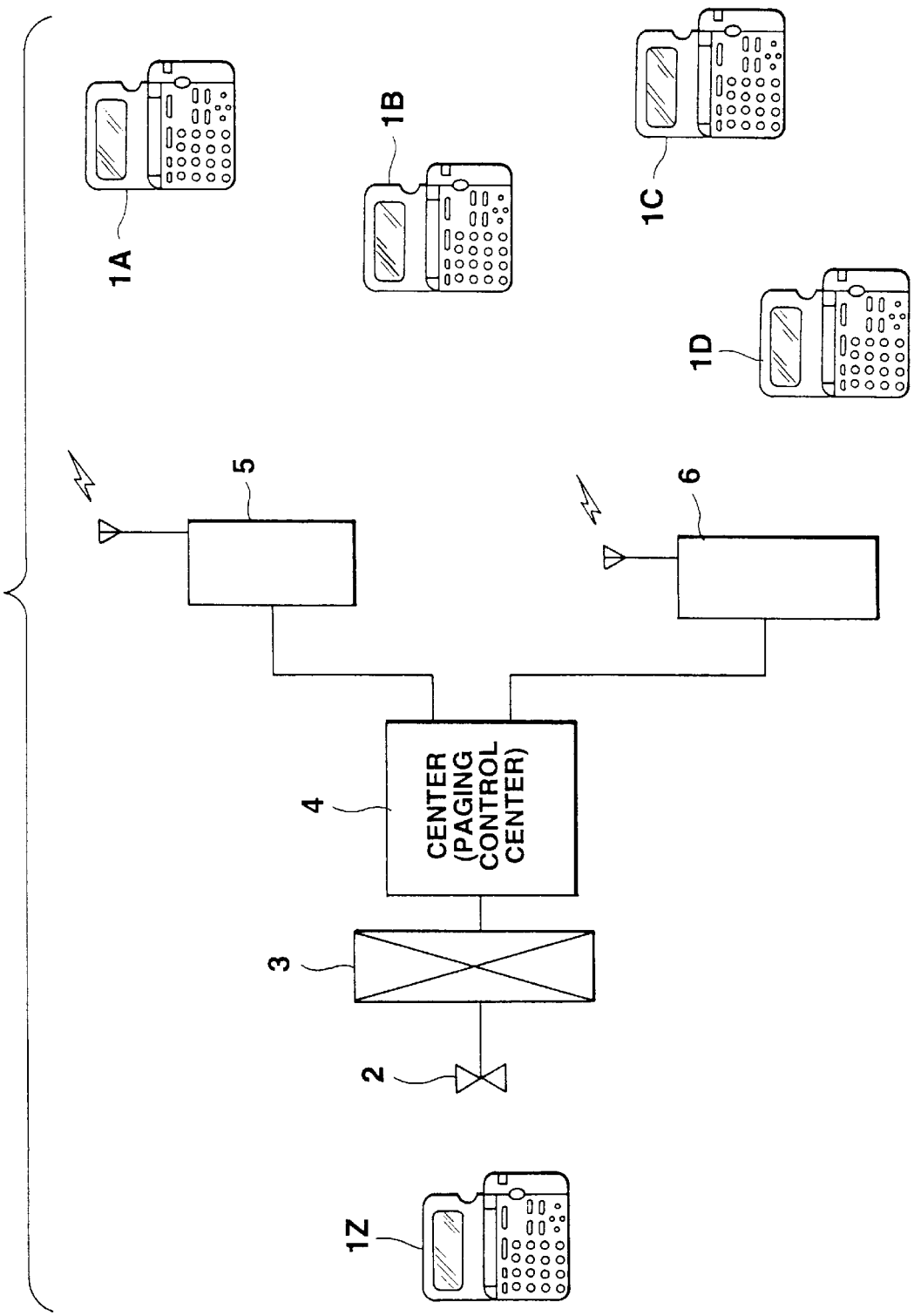

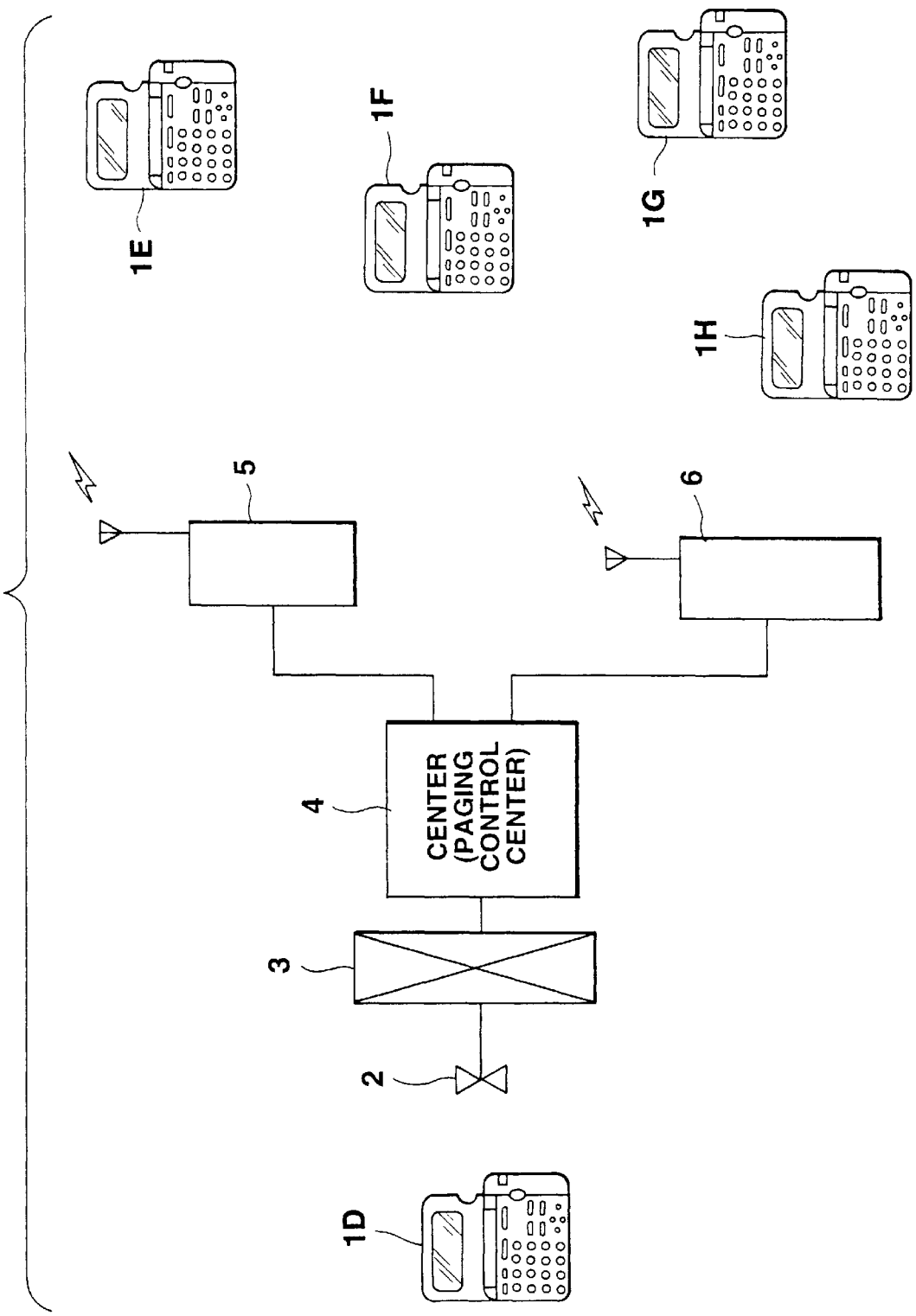

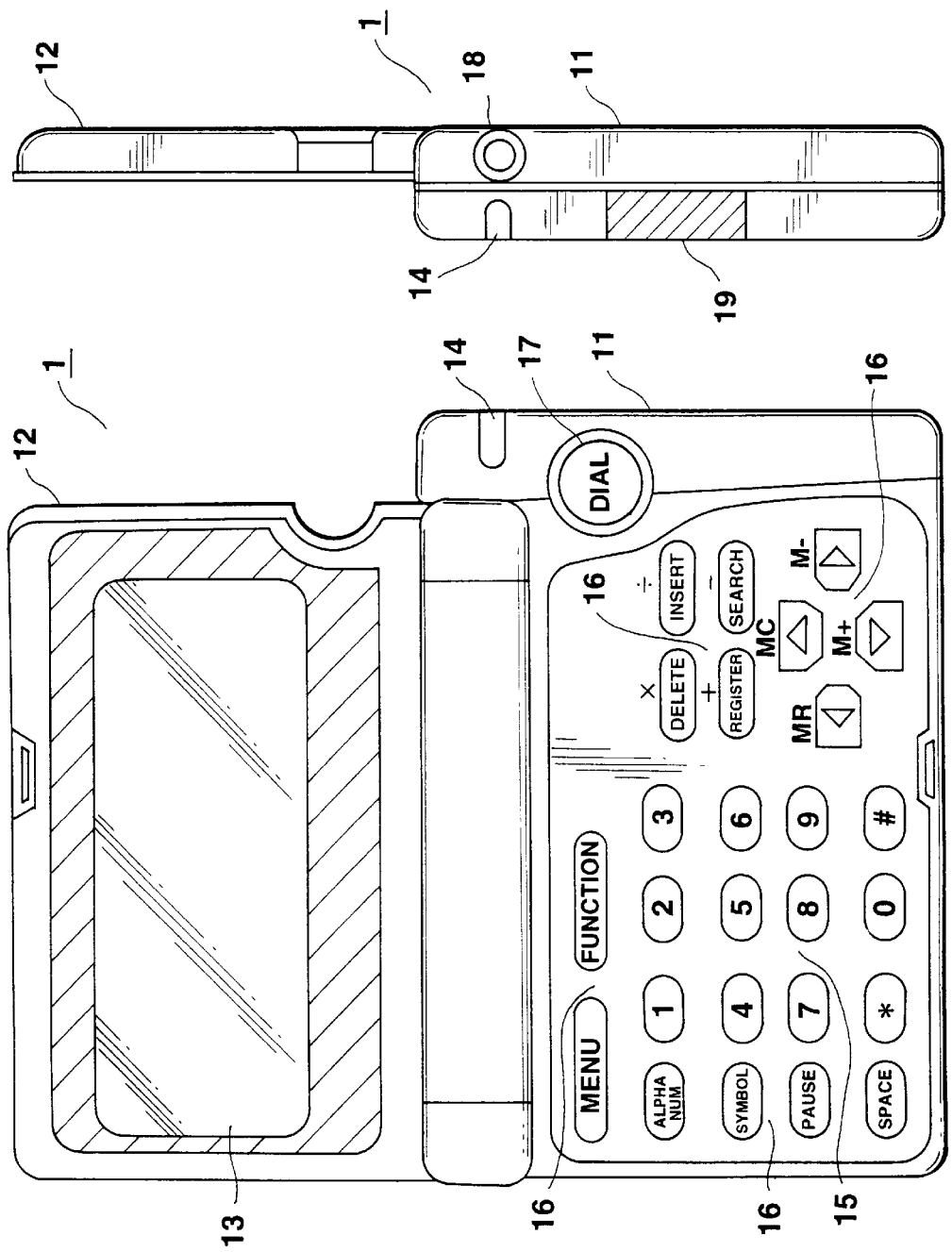
FIG.4A / FIG.4B

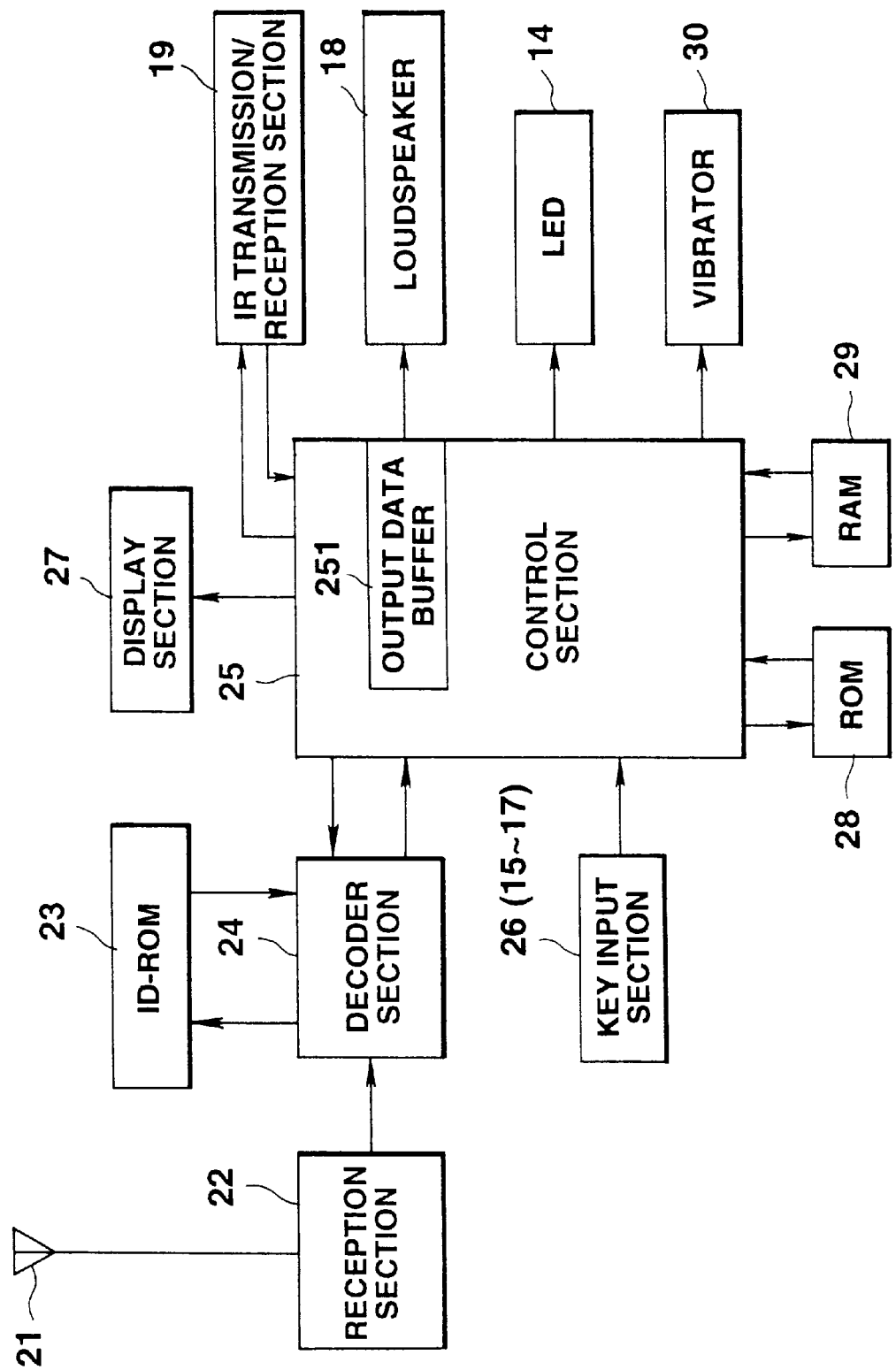

FIG.6

|   | 0 | 1 | 2 | 3 | 4 | 5 | 6 | 7 | 8 | 9 |
|---|---|---|---|---|---|---|---|---|---|---|
| 0 | ア | イ | ウ | エ | オ | A | B | C | D | E |
| 1 | カ | キ | ク | ケ | コ | F | G | H | I | J |
| 2 | サ | シ | ス | セ | ソ | K | L | M | N | O |
| 3 | タ | チ | ツ | テ | ト | P | Q | R | S | T |
| 4 | ナ | ニ | ヌ | ネ | ノ | U | V | W | X | Y |
| 5 | ハ | ヒ | フ | ヘ | ホ | Z | : | ' | ? | . |
| 6 | マ | ミ | ム | メ | モ | ァ | ィ | ゥ | ェ | ォ |
| 7 | ヤ | ( | ユ | ) | ヨ | ャ | ュ | ョ | — | ッ |
| 8 | ラ | リ | ル | レ | ロ | 1 | 2 | 3 | 4 | 5 |
| 9 | ワ | ヲ | ン | " | ° | 6 | 7 | 8 | 9 | 0 |

FIG.7

|   | 0 | 1 | 2 | 3 | 4 | 5 | 6 | 7 | 8 | 9 |
|---|---|---|---|---|---|---|---|---|---|---|
| 0 | A | B | C | D | E | F | G | H | I | J |
| 1 | K | L | M | N | O | P | Q | R | S | T |
| 2 | U | V | W | X | Y | Z | , | ? | ! | . |
| 3 | a | b | c | d | e | f | g | h | i | j |
| 4 | k | l | m | n | o | p | q | r | s | t |
| 5 | u | v | w | x | y | z | : | ; | ' | SP |
| 6 | ' | ' | " | " | ( | ) | [ | ] | { | } |
| 7 | # | $ | & | ~ | @ | ^ | / | \ | _ | DEL |
| 8 | + | - | * | < | = | > | % | ① | ② | ③ |
| 9 | 0 | 1 | 2 | 3 | 4 | 5 | 6 | 7 | 8 | 9 |

FIG.8

| | CALL NUMBER BANK MEMORY AREA 31 | | | RECEIVED MESSAGE MEMORY AREA 32 | | RECEIVED QUESTION MESSAGE MEMORY AREA 33 | | | ANSWER MESSAGE MEMORY AREA 34 | | | FORMED QUESTION MESSAGE MEMORY AREA 35 |
|---|---|---|---|---|---|---|---|---|---|---|---|---|
| BATCH TRANSMISSION DESIGNATION FLAG REGISTER | SUBSCRIBER (USER) ID NUMBER | SUBSCRIBER (USER) NAME | SUBSCRIBER (USER) ADDRESS (CALL NUMBER) | | | | | | | | | |
| MEMORY ADDRESS | | CONTENTS OF MESSAGE | | RECEPTION DATE | | | | | | | | |
| MEMORY ADDRESS | SUBSCRIBER (USER) ID NUMBER | | | | CONTENTS OF QUESTION MESSAGE | | CHOICE CONTENTS | | | | | |
| ANSWER NUMBER FLAG REGISTER | GROUP ANSWER FLAG REGISTER | | | | | SUBSCRIBER (USER) ID NUMBER | ANSWER NUMBER FLAG REGISTER | GROUP ANSWER REGISTER | | | | |

| TRANSMISSION DESIGNATION FLAG REGISTER | SUBSCRIBER (USER) ID NUMBER | SUBSCRIBER (USER) NAME | SUBSCRIBER (USER) ADDRESS (CALL NUMBER) |
|---|---|---|---|
| 0 | 0000 | SAITO | 000-000-0000 |
| 0 | 1111 | OISHI | 111-111-1111 |
| 0 | 2222 | MURAKAMI | 222-222-2222 |
| 0 | 3333 | YASHIKI | 333-333-3333 |
| 0 | 5555 | TANAKA | 555-555-5555 |
| ⋮ | ⋮ | ⋮ | ⋮ |

| TRANSMISSION DESIGNATION FLAG REGISTER | SUBSCRIBER (USER) ID NUMBER | SUBSCRIBER (USER) NAME | SUBSCRIBER (USER) ADDRESS (CALL NUMBER) |
|---|---|---|---|
| 0 | 0000 | SAITO | 000-000-0000 |
| 0 | 2222 | MURAKAMI | 222-222-2222 |
| 0 | 3333 | YASHIKI | 333-333-3333 |
| 0 | 4444 | AOKI | 444-444-4444 |
| 0 | 5555 | TANAKA | 555-555-5555 |
| ⋮ | ⋮ | ⋮ | ⋮ |

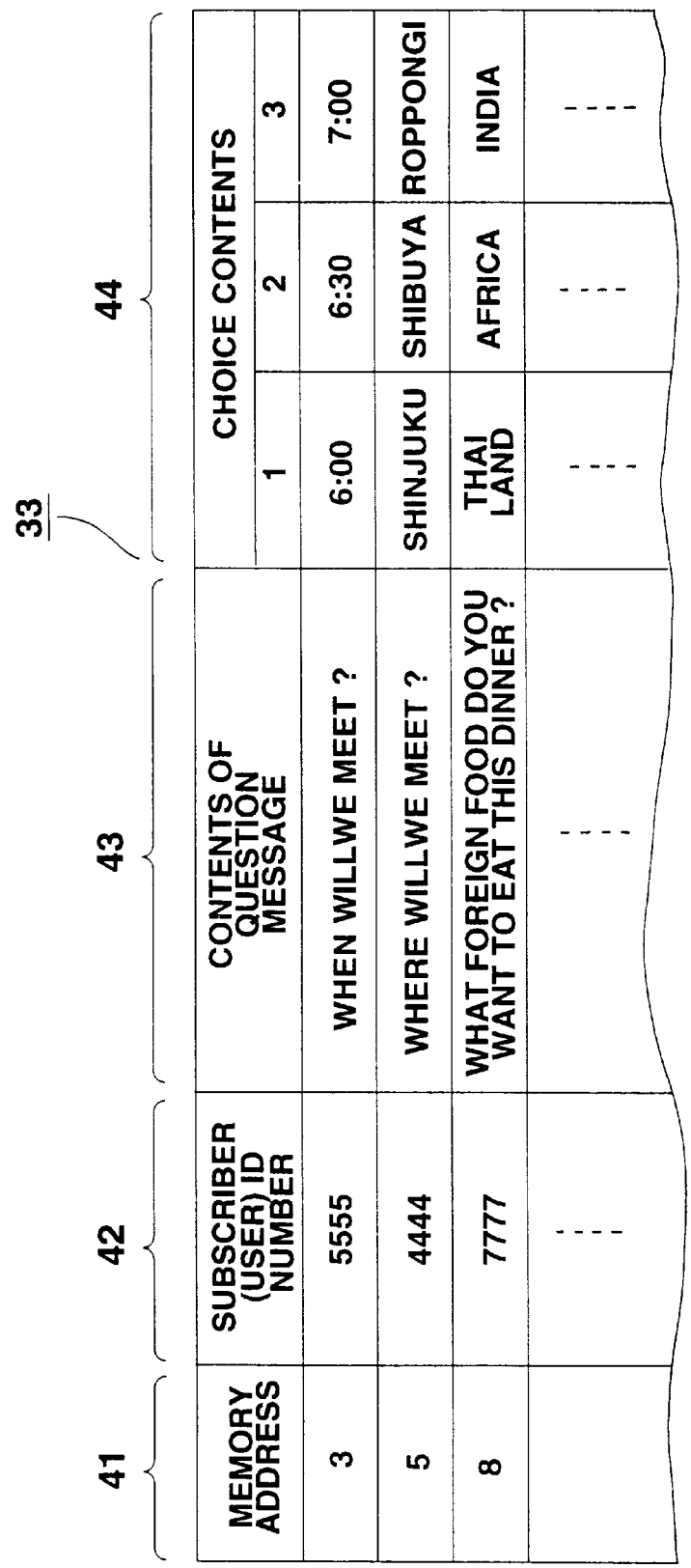

FIG.12A

| ANSWER FLAG REGISTER (51) | GROUP ANSWER FLAG REGISTER (52) | SUBSCRIBER (USER) ID NUMBER REGISTER (53) | ANSWER NUMBER FLAG REGISTER (54) | | | GROUP ANSWER REGISTER (55) | | |
|---|---|---|---|---|---|---|---|---|
| | | | 1 | 2 | 3 | 1 | 2 | 3 |
| 0 | 0 | 0000 | | | | | | |
| 0 | 0 | 1111 | | | | | | |
| 0 | 0 | 3333 | | | | | | |

FIG.12B

| ANSWER FLAG REGISTER | GROUP ANSWER FLAG REGISTER | SUBSCRIBER (USER) ID NUMBER REGISTER | ANSWER NUMBER FLAG REGISTER | | | GROUP ANSWER REGISTER | | |
|---|---|---|---|---|---|---|---|---|
| | | | 1 | 2 | 3 | 1 | 2 | 3 |
| 0 | 0 | 0000 | | | | | | |
| 1 | 0 | 1111 | 1 | | | | | |
| 0 | 0 | 3333 | | | | | | |

FIG.12C

| ANSWER FLAG REGISTER | GROUP ANSWER FLAG REGISTER | SUBSCRIBER (USER) ID NUMBER REGISTER | ANSWER NUMBER FLAG REGISTER | | | GROUP ANSWER REGISTER | | |
|---|---|---|---|---|---|---|---|---|
| | | | 1 | 2 | 3 | 1 | 2 | 3 |
| 0 | 0 | 0000 | | | | | | |
| 1 | 0 | 1111 | 1 | | | | | |
| 1 | 1 | 3333 | | | 1 | 3 | 0 | 1 |

MESSAGE TRANSMISSION MODE

C ▶ ○ ORDINARY MESSAGE
QUESTION MESSAGE
ANSWER MESSAGE

○ QUESTION MESSAGE

NUMBER OF SUBSCRIBERS (USERS) WHO HAVE NOT ANSWERED   1

○ TRANSMIIT AGAIN

C ▶ ○ DELETE

○ QUESTION MESSAGE

WHERE WILL WE MEET ?

1. SHINJUKU
2. SHIBUYA
3. ROPPONGI

10:11

- TEMPORARY
- SAITO
- OISHI
  MURAKAMI
C  • YASHIKI

10:00

○ ANSWER MESSAGE

WHERE WILL WE MEET ? /AOKI

1. SHINJUKU
C 2. SHIBUYA
 3. ROPPONGI

FIG.22A

| SUBSCRIBER (USER) WHO HAS NOT ANSWERED | 3 | ANSWER NUMBER "1" | 0 | ANSWER NUMBER "2" | 0 | ANSWER NUMBER "3" | 0 |
|---|---|---|---|---|---|---|---|
| SAITO<br>OISHI<br>YASHIKI | | | | | | | |
| GROUP | 0 | ANSWER NUMBER "1" | 0 | ANSWER NUMBER "2" | 0 | ANSWER NUMBER "3" | 0 |
| | | | | | | | |
| TOTAL | 0 | ANSWER NUMBER "1" | 0 | ANSWER NUMBER "2" | 0 | ANSWER NUMBER "3" | 0 |

Braces: rows 1–2 → 61; rows 3–5 → 62

FIG.22B

| SUBSCRIBER (USER) WHO HAS NOT ANSWERED | 2 | ANSWER NUMBER "1" | 0 | ANSWER NUMBER "2" | 1 | ANSWER NUMBER "3" | 0 |
|---|---|---|---|---|---|---|---|
| SAITO<br>- - - - - - - - → OISHI<br>YASHIKI | | | | | | | |
| GROUP | 0 | ANSWER NUMBER "1" | 0 | ANSWER NUMBER "2" | 0 | ANSWER NUMBER "3" | 0 |
| | | | | | | | |
| TOTAL | 0 | ANSWER NUMBER "1" | 0 | ANSWER NUMBER "2" | 1 | ANSWER NUMBER "3" | 0 |

FIG.22C

| SUBSCRIBER (USER) WHO HAS NOT ANSWERED | 1 | ANSWER NUMBER "1" | 0 | ANSWER NUMBER "2" | 1 | ANSWER NUMBER "3" | 1 |
|---|---|---|---|---|---|---|---|
| SAITO<br>               OISHI<br>- - - - - - - - - - - - → YASHIKI | | | | | | | |
| GROUP | 4 | ANSWER NUMBER "1" | 3 | ANSWER NUMBER "2" | 0 | ANSWER NUMBER "3" | 1 |
| YASHIKI | | | | | | | |
| TOTAL | 6 | ANSWER NUMBER "1" | 3 | ANSWER NUMBER "2" | 1 | ANSWER NUMBER "3" | 2 |

FIG.24

| | | | | CALL NUMBER BANK MEMORY AREA 31 | FORMAD QUESTION MEMORY AREA 71 | RECEIVED MESSAGE MEMORY AREA 72 | RECEIVED QUESTION MESSAGE MEMORY AREA 73 | ANSWER MESSAGE MEMORY AREA 74 |
|---|---|---|---|---|---|---|---|---|

29

| FLAG REGISTER | SUBSCRIBER (USER) ID NUMBER | SUBSCRIBER (USER) NAME | SUBSCRIBER (USER) ADDRESS (CALL NUMBER) | | | | |
|---|---|---|---|---|---|---|---|
| QST NO. | QUESTION MESSAGE CONTENTS | | | | | | |
| MEMORY ADDRESS | MESSAGE CONTENTS | | | TERMINATION DATE | | | |
| MEMORY ADDRESS | SUBSCRIBER (USER) ID NUMBER | QST NO. | QUESTION MESSAGE CONTENTS | | | | |
| QST NO. | SUBSCRIBER (USER) ID NUMBER | ANSWER CONTENTS | | | | | |
| QST NO. | SUBSCRIBER (USER) ID NUMBER | ANSWER CONTENTS | | | | | |

FIG.25

| MEMORY ADDRESS (81) | SUBSCRIBER (USER) ID NUMBER (82) | QST NO. (83) | QUESTION MESSAGE CONTENTS (84) |
|---|---|---|---|
| 3 | 4444 | 01 | ANY STORE SELLING INEXPENSIVE GOOD ? |
| 5 | 3333 | 01 | ANY GOOD RESTAURANT ? |
| 8 | 4444 | 02 | ANY GOOD MOVIE ? |
| 11 | 2222 | 01 | ANY PLACE WHICH IS NOT CROWDED ? |
| ⋮ | ⋮ | ⋮ | ⋮ |

| QST NO. | SUBSCRIBER (USER) ID NUMBER | ANSWER CONTENTS |
|---|---|---|
| 01 | 0000 | DEPARTMENT STORE A |
|  | 1111 | DEPARTMENT STORE B |
|  | 3333 | SUPERMARKET C |
|  | ⋮ | ⋮ |

FIG.26B

| QST NO. | SUBSCRIBER (USER) ID NUMBER | ANSWER CONTENTS |
|---|---|---|
| 02 | 2222 | ------------ |
|  | ⋮ | ⋮ |

FIG.34

○ ANSWER MESSAGE    10:00

ANY STORE SELLING
INEXPENSIVE GOODS ?    / AOKI    01
        12.12  12:30

DEPARTMENT STORE A

FIG.35

○ QUESTION/ANSWER    10:00

ANY STORE SELLING
INEXPENSIVE GOODS ?    01

DEPARTMENT STORE A    / SAITO
DEPARTMENT STORE B    / OISHI
SUPERMARKET C         / YASHIKI

DATA COMMUNICATION SYSTEM AND DATA COMMUNICATION TERMINAL APPLIED THERETO

This is a continuation division of application Ser. No. 08/576,484 filed Dec. 21, 1995, pending.

BACKGROUND OF THE INVENTION

1. Field of the Invention

The present invention relates to a data communication system applied to a data communication terminal such as paging receiver, and a data communication terminal using the system.

2. Description of the Related Art

In a paging system based on the POCSAG scheme, a common address data is stored in the ID-ROMs of a plurality of paging receivers so that a caller can perform simultaneous paging to a plurality of subscribers who are carrying paging receivers having the common address data by transmitting this address data from a telephone terminal through a switching center. This simultaneous paging method is called a group call method among those skilled in the art and is used as a paging service.

If, therefore, a caller transmits a question message requesting an answer, as message data, following the common address data by the group call method using a computer terminal connected to a telephone line, a plurality of subscribers who are carrying paging receivers which have simultaneously received this question message can prepare answers to the received question message, and can return the answers to the computer terminal which has sent the question message.

In transmitting a question message by using the group call and obtaining a plurality of answers in this manner, it is difficult for the user of the computer terminal, which has sent the question message, to specify a paging receiver (subscriber) in the group every time an answer is obtained. In addition, when a plurality of question messages are transmitted to the same group, it is difficult to discriminate a specific question message to which a given answer corresponds.

The exchange of a question message and answers in a group by the group call method in such a system is effective for only very limited purposes. That is, this method is not very convenient.

As a new paging service which replaces the conventional POCSAG scheme, a paging service based on an advanced radio paging system called RCRSTD-43 will be put into practice in Japan.

This paging system will be briefly described with reference to FIGS. 1A to 1C.

FIG. 1 shows a scheme of signal transmission which is employed in the above advanced radio paging system. The format (A) in FIG. 1 shows a data configuration. The format (B) in FIG. 1 shows a cycle configuration. The format (C) in FIG. 1 shows a frame configuration.

The data configuration (A) in FIG. 1 consists of 15 cycles which are numbered "#0" to "#14". The 15 cycles are transmitted at one-hour intervals. The cycle configuration (B) in FIG. 1 consists of 128 frames which are numbered "#0" to "#127". The 128 frames are transmitted at four-minute intervals. The frame configuration (C) in FIG. 1 consists of eight pieces of information, i.e., a first synchronous portion S1, frame information FI, a second synchronous portion S2, block information BI, an address field AF, a vector field VF, a message field MF, and an idle block IB.

In this frame configuration, the eight pieces of information define the following contents.

More specifically, the first synchronous portion S1 defines the frame type (the modulation scheme and transmission rate) of this frame. The frame information FI defines the frame number of the frame, a cycle number at which the frame is present, and the like. The second synchronous portion S2 defines timing information which is used to establish a reception timing in a called paging receiver in transmitting data in accordance with the frame type defined by the first synchronous portion S1. The block information BI defines word numbers at which the address field AF and the vector field VF respectively start, and the necessary numbers of words. The address field AF defines ID data, specifically address data, stored in each called receiver. The vector field VF is defined in a one-to-one correspondence with the address field AF. The vector field VF defines a word number at which the message field MF is started, the necessary number of words, a vector type (tone only, a numerical message, and the like) specifying a message to be transmitted. The message field MF is used to store message data to be actually transmitted. The idle block IB is an unused block, in which a pattern of "1"s or "0"s is set.

According to paging services using the above advanced radio paging system, therefore, various services which cannot be provided by the conventional POCSAG scheme can be realized.

As one of the services, a service based on a group call method using temporary address data can be realized, in addition to a service based on the conventional group call method using group address data.

In this method, a plurality of paging receivers which do not share group address data are simultaneously paged. The method will be described below.

1. A caller designates the group call mode using temporary address data and transmits the call numbers of a plurality of paging receivers to be called and a common message to a center (paging control center).

2. When the group call mode is designated by the caller using the temporary address data, the center transmits address field AF contents address data for calling the designated paging receivers thereto, together with vector field VF contents vector data of a simplified instruction vector type which defines the temporary address data and a frame number at which the temporary address data is stored.

3. Upon terminating this vector data, each of the called paging receivers writes the temporary address data in an address register in a decoder, and also writes the frame number data at which the temporary address data is stored in a frame register, thereby controlling the reception frame timing. At the designated frame number, each paging receiver detects the temporary address data in accordance with the address field AF.

4. When each paging receiver detects the temporary address data at the designated frame number in accordance with the address field AF, the receiver receives the common message stored in the successive message field MF, notifies that the message is terminated, and displays it.

According to the above method, therefore, a plurality of paging receivers to be subjected to simultaneous paging need not have common address data. That is, a more convenient group call method can be realized.

In the above method, however, the following problem is posed.

When a caller designates the group call mode using temporary address data, he/she must input all the call numbers of a plurality of paging receivers to be called through a telephone terminal connected to the center. If the caller is to use a push-phone through a public telephone network, a cumbersome input operation is required. The caller is therefore liable to make a mistake.

The present invention has been made in consideration of the above problem, and has as its object to provide a data communication system in which a caller can selectively perform batch transmission of a question message to a plurality of callees and totalize a plurality of answers to this question in a readable form, and a data communication terminal using the system.

SUMMARY OF THE INVENTION

It is an object of the present invention to provide a data communication system comprising a first communication terminal and second communication terminals capable of at least one-way radio communication of data, in which the first communication terminal transmits a question message and answers to the question message to the second communication terminals, each of the second communication terminals can display the question message and the answers on a second display means, each second communication terminal transmits an answer to the question message to the first communication terminal, and the first communication terminal can receive, totalize, and display the answers.

In order to achieve the above objects, a communication system of the present invention and a communication terminal applied thereto have the following arrangements.

In other words, the communication system comprises a group constituted by a plurality of communication terminals, each including reception means for receiving ID data for identifying an own data communication terminal, display means for displaying a message, and transmission means for converting the message into corresponding code data and transmitting the data, and in which data is exchanged between a first communication terminal and second communication terminals in the group by radio, the first communication terminal comprising first transmission means for converting a message requesting an answer and answers each constituted by a plurality of answer messages corresponding to the message requesting an answer and answer numbers corresponding to the answer messages into corresponding code data, and performing batch transmission of the code data together with first ID data for identifying the own data communication terminal and ID data for identifying each of the second communication terminals, the second communication terminal comprising first reception means for receiving the first ID data, the message requesting an answer, and the answers which are transmitted from the first transmission means display control means for displaying the message requesting an answer, and the answers on the display means, first selection means for selecting an answer number from the answers, and first returning means for returning the selected answer number together with the first ID data, and the first communication terminal further comprising second reception means for receiving a plurality of selected answer numbers, first answer memory means for totalizing and storing the selected answer numbers, and second display control means for displaying the answer numbers on the display means in a totalized state.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principles of the invention.

FIG. 2 is a view showing the arrangement of a paging system according to the first embodiment of the present invention;

FIG. 3 is a view showing the arrangement of the paging system according to the first embodiment of the present invention;

FIGS. 4A and 4B are views showing the outer appearance of each of paging receivers 1 (1A to 1H and 1Z) according to the first embodiment;

FIG. 5 is a block diagram showing the circuit arrangement of the paging receiver 1 (1A to 1H and 1Z) according to the first embodiment;

FIG. 6 is a view showing a character data matrix according to the first embodiment;

FIG. 7 is a view showing a character data matrix according to the first embodiment;

FIG. 8 is a view showing the arrangement of the memory areas of the RAM 29 according to the first embodiment;

FIG. 9 is a view showing the stored contents of a call number bank memory area 31 of the paging receiver 1Z according to the first embodiment;

FIG. 10 is a view showing the stored contents of a call number bank memory area 31 of the paging receiver 1B according to the first embodiment;

FIG. 11 is a view showing the stored contents of a terminated question message memory area 33 according to the first embodiment;

FIGS. 12A to 12C are views showing the stored contents of an answer message memory area 34 according to the first embodiment;

FIG. 18 is a view showing a display state in an operation according to the first embodiment;

FIG. 19 is a view showing a display state in an operation according to the first embodiment;

FIG. 20 is a view showing a display state in an operation according to the first embodiment;

FIGS. 22A to 22C are views each showing a display state in an operation according to the first embodiment;

FIG. 24 is a view showing the arrangement of the memory areas of a RAM 29 according to the second embodiment of the present invention;

FIG. 25 is a view showing the stored contents of a terminated question message memory area 73 according to the second embodiment;

FIGS. 26A and 26B are views showing the stored contents of an answer message memory area 74 according to the second embodiment;

FIG. 34 is a view showing a display state in an operation according to the second embodiment;

FIG. 35 is a view showing a display state in an operation according to the second embodiment;

DETAILED DESCRIPTION OF THE PREFERRED EMBODIMENTS

Figure 1A:
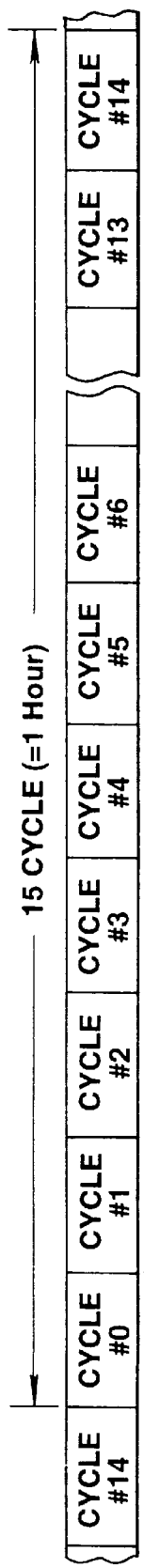
FIGS. 1A to 1C are views showing a scheme of signal transmission in a paging system according to the present invention.

A paging receiver having a transmission function of transmitting data upon outputting a DTMF signal according to the first embodiment of the present invention will be described below. In this case, the paging receiver exchanges question messages and answers with a plurality of specific paging receivers in a group.

FIG. 2 shows a manner of getting a paging service using paging receivers 1 (1A to 1D and 1Z) according to the present invention. Referring to FIG. 2, a center (paging control center) 4 managed by a paging service company is connected to a public telephone network 3 to which a telephone terminal 2 such as a push-phone is connected. In addition, transmission base stations 5 and 6 are connected to the center 4. Note that the paging receivers 1A to 1D share the same group address data. When a simultaneous paging operation using the group address data is performed, all the paging receivers 1A to 1D are subjected to this operation.

In the first embodiment, the caller as the user of the paging receiver 1Z operates the paging receiver 1Z to transmit a dedicated reception telephone number to the center 4, thereby designating a group call using the temporary address data of the paging receivers 1A, 1B, and 1D. In addition, the caller performs batch transmission of a question message to the paging receivers 1A, 1B, and 1D, to which the group call has been made.

Each of the called paging receivers 1A, 1B, and 1D receives the question message data following the temporary address data, and returns an answer message to the question to the paging receiver 1Z by the same method as a general individual selective calling method.

As shown in FIG. 3, of the paging receivers 1A, 1B, and 1D constituting the group, the paging receiver 1D further transmits the received question message to all paging receivers 1E to 1H constituting a lower group (sharing the same group address data) by performing simultaneous paging based on the group call method. The paging receiver 1D then totalizes answer messages returned from the paging receivers 1E to 1H, and returns this group answer data to the paging receiver 1Z, together with the answer of the paging receiver 1D itself.

The paging receiver 1Z, which receives the answer messages from the paging receivers 1B and 1D of the paging receivers 1A, 1B, and 1D, totalizes the sequentially returned answer messages.

FIGS. 4A and 4B show the outer appearance of each of the paging receivers 1 (1Z, 1A to 1D, and 1E to 1H). FIG. 4A is a front view of the paging receiver. FIG. 4B is a right side view of the paging receiver. The paging receiver 1 is constituted by a case body 11 and a cover portion 12. Both FIG. 4A and 4B show the paging receiver with the cover portion 12 being open.

More specifically, the cover portion 12 is pivotally supported by support shafts (not shown). A liquid crystal display panel 13 is disposed on the inner surface of the cover portion 12. Function keys 16 including a "MENU" key, a "FUNCTION" key, an "ALPHANUM" key, a "SYMBOL" key, a "PAUSE" key, a "SPACE" key, a "DELETE" key, an "INSERT" key, a "REGISTER" key, a "SEARCH" key, and cursor keys for moving the cursor in the vertical and horizontal directions, and dial keys 15 including "1" to "9" keys, a "0" key, an "*" key, and a "#" key are arranged on the inner surface of the case body 11 which is brought into contact with the liquid crystal display panel 13 when the cover portion 12 is closed. When, for example, the paging receiver is carried, these keys are protected while the cover portion 12 is closed.

The liquid crystal display panel 13 is of a dot matrix type which has a size of, e.g., 119 dots (horizontal)×31 dots (vertical) and can display 20 characters (horizontal)×4 characters (vertical), i.e., a total of 80 characters, each having a size of 5 dots (horizontal)×7 dots (vertical). The liquid crystal display panel 13 includes a back light based on EL (electroluminescence) as needed.

In combination with the function keys 16, the dial keys 15 allow the user to input kana characters, letters, and the like as well as numbers. The paging receiver has a call number bank function of storing the call numbers of pagers in correspondence with the names of users and editing the data, e.g., selectively displaying, registering, or deleting the data, as needed. The paging receiver also has an electronic calculator function of performing numerical calculation by using the dial keys 15 and the function keys 16.

In addition, the paging receiver has a dial transmission key 17 which can be operated even while the cover portion 12 is closed. An LED lamp 14 for indicating a called state or the like is arranged near the dial transmission key 17.

A loudspeaker 18 also serving as a DTMF signal output section, and an IR transmission/reception section 19 are arranged on the right side surface of the case body 11. The IR transmission/reception section 19 is used to perform infrared transmission/reception of data to/from another paging receiver 1 or another electronic device having an infrared communication function. If the telephone terminal 2 has an IR reception section, the paging receiver can transmit message data or the like prepared by using an IR signal instead of a DTMF signal. The IR transmission/reception section 19 incorporates an infrared reception section constituted by a phototransistor and the like, and an infrared element section constituted by an LED lamp and the like.

Although not shown, a power switch for turning on/off the power supply, a reset key for stopping notification of a called state, and the like are arranged on the left side surface of the case body 11.

The arrangement of an electronic circuit in the case body 11 and the cover portion 12 will be described next with reference to FIG. 5. Referring to FIG. 5, reference numeral 21 denotes an antenna. A radio wave received by the antenna 21 is sent to a reception section 22. The reception section 22 is driven by a decoder section 24 to perform intermittent reception. The reception section 22 amplifies/demodulates a received radio wave, and outputs the resultant signal to the decoder section 24. The decoder section 24 decodes the demodulated signal, and refers to the ID code individually assigned to the paging receiver, more specifically the frame data or the address data (self-address, group (common) address) stored in an ID-ROM 23, to determine whether the received address data coincides with the self-address data and the group address data. If they coincide with each other, the decoder section 24 sends a coincidence detection signal and the succeeding message data to a control section 25.

The control section 25 controls other operations of the overall circuit in accordance with a signal from the decoder section 24 and an input signal from a key input section 26 constituted by the dial keys 15, the function keys 16, and the dial transmission key 17. The control section 25 is connected to a display section 27 constituted by the liquid crystal display panel 13 and its driving circuit. In addition, a ROM 28, a RAM 29, the IR transmission/reception section 19, the loudspeaker 18, the LED lamp 14, and a vibrator 30 are connected to the control section 25. An output buffer 251 is a circuit for temporarily storing data output as a DTMF signal.

The loudspeaker 18 outputs an alarm sound notifying a called state through a driving circuit (not shown) under the control of the control section 25. In addition, the loudspeaker 18 has a D/A conversion section and can output a DTMF signal based on a call number for calling another paging receiver. Similarly, the LED lamp 14 flickers to notify a called state, and the vibrator 30 vibrates to notify a called state.

The ROM 28 stores control programs prepared for the control section 25. The ROM 28 also stores a character data matrix and a character generator (not shown) for a free message mode.

In this case, the data matrix for the free message mode indicates katakana characters, letters, numbers, and symbols corresponding to two-digit numbers serving as designation codes, as shown in FIG. 6. When, for example, codes "16" and "52" are designated, the letter "G" and the katakana character " ツ " can be obtained, respectively.

Alternatively, as a character data matrix for the free message mode, the matrix shown in FIG. 7 may be used. In this matrix, alphanumeric character data corresponding to letters (capital letter and small letters), numbers, and symbols, which are displayed on the liquid crystal display panel 13, are stored in the form of a matrix. In this case, when, for example, codes "16" and "86" are designated, a capital letter "Q" and the symbol "%" can be obtained, respectively. Both the first and second embodiments of the present invention will be described in detail with reference to the character data matrix in FIG. 7.

The RAM 29 is backed up by the power supply regardless of the ON/OFF state of the power switch to retain the stored contents. The RAM 29 has a memory map like the one shown in FIG. 8. More specifically, the RAM 29 has a call number bank memory area 31, a received message memory area 32, a terminated question message memory area 33, an answer message memory area 34, and a prepared question message memory area 35.

The call number bank memory area 31 is an area for storing data associated with a plurality of subscribers. Data corresponding to one subscriber contains a simultaneous paging designation flag register, the subscriber (user) ID number, the subscriber (user) name, the subscriber address which is the call number of the paging receiver of the subscriber.

The received message memory area 32 is an area for storing a plurality of sets of data. Each set of data has an address at which a message terminated by the paging receiver 1 is stored, the contents of the terminated message, and the termination date.

The terminated question message memory area 33 is an area for storing a plurality of sets of data. Each set of data has a memory address at which a question message terminated by the paging receiver 1 is stored, a subscriber (user) ID number, the contents of the question message, and choice contents.

The answer message memory area 34 is an area for storing a plurality of sets of data prepared and stored in correspondence with question messages which are prepared by the paging receiver 1, transmitted to paging receivers which will answer the question messages, and stored in the prepared question message memory area 35. Each set of data contains an answer flag register, a group answer flag register, a subscriber ID number, an answer number flag register, and a group answer count.

The prepared question message memory area 35 is an area for storing question message contents prepared in accordance with the flow charts in FIGS. 13 to 15 (to be described later) and choice contents prepared together with this question message.

The operation of the embodiment having the above arrangement will be described next.

Assume that a DTMF signal is output from the paging receiver 1Z carried by a user with subscriber ID number "4444" and a subscriber name "AOKI" to the paging receiver 1A carried by a user with subscriber ID number "0000" and a subscriber name "SAITO", the paging receiver 1B carried by a user with subscriber ID number "1111" and a subscriber name "OISHI", and the paging receiver 1D carried by a user with subscriber ID number "3333" and a subscriber name "YASHIKI" in the same group through the telephone terminal 2 so as to perform batch transmission of a question message thereto by using the temporary address data, and receives/totalizes answer messages (answer numbers) to the question from the paging receivers 1A, 1B, and 1D by radio, as shown in FIG. 2.

In this case, as shown in FIG. 3, at the paging receiver 1D carried by the user with subscriber ID number "3333" and the subscriber name "YASHIKI", "YASHIKI" answers the question and also performs batch transmission of the question message to all the paging receivers 1E to 1H of another group through the telephone terminal 2 by using the group address data. The paging receiver 1D totalizes answer messages received from the paging receivers 1E to 1H, and returns the group answers of this group constituted by paging receivers 1E to 1H to the paging receiver 1Z.

Assume that data contents like those shown in FIGS. 9 and 10 are respectively stored in the call number bank memory areas 31 of the RAMs 29 of the paging receivers 1Z and 1B in advance.

Figure 13:
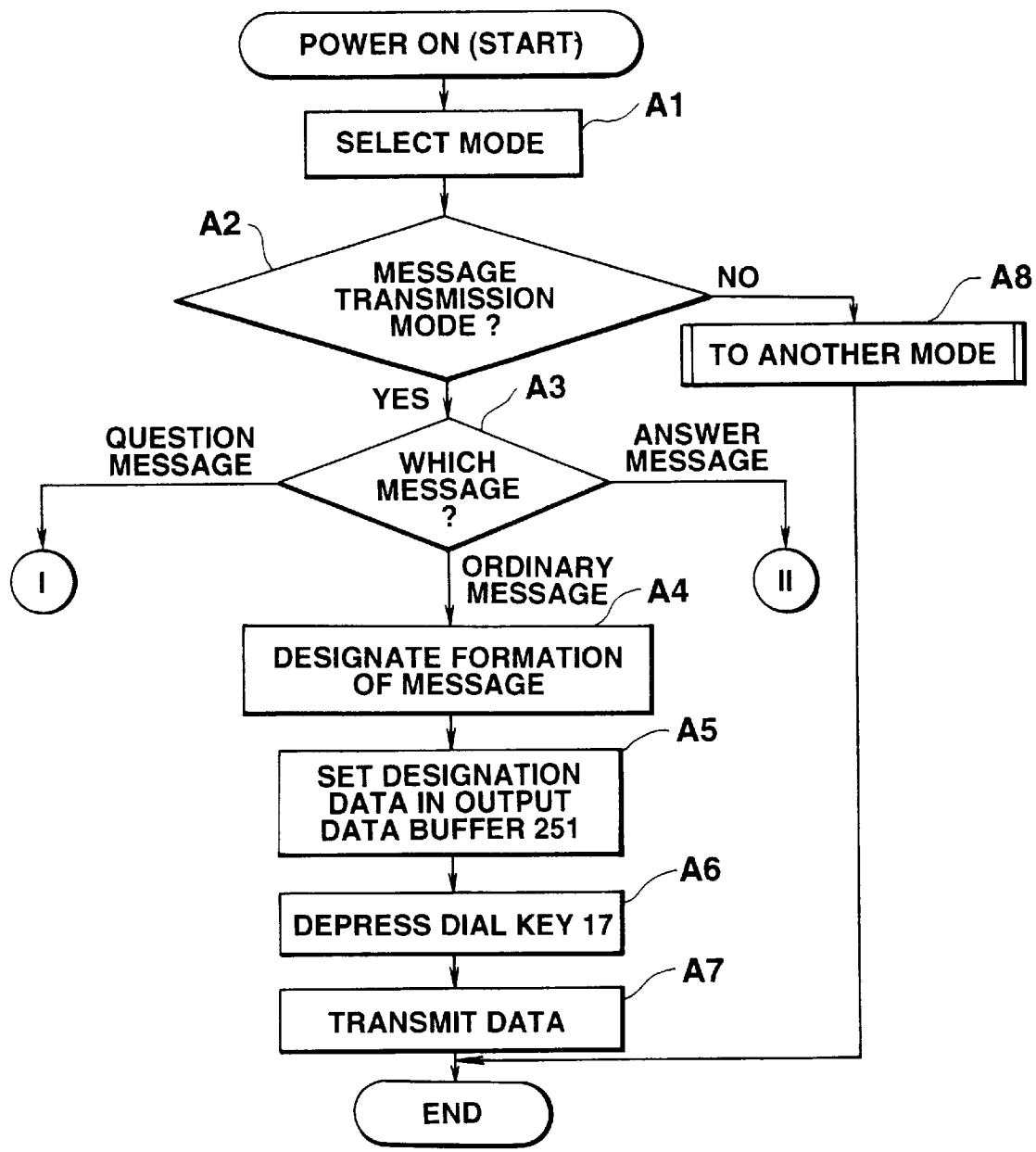
FIG. 13 is a flow chart showing the contents of transmission processing according to the first embodiment.
Figure 14:
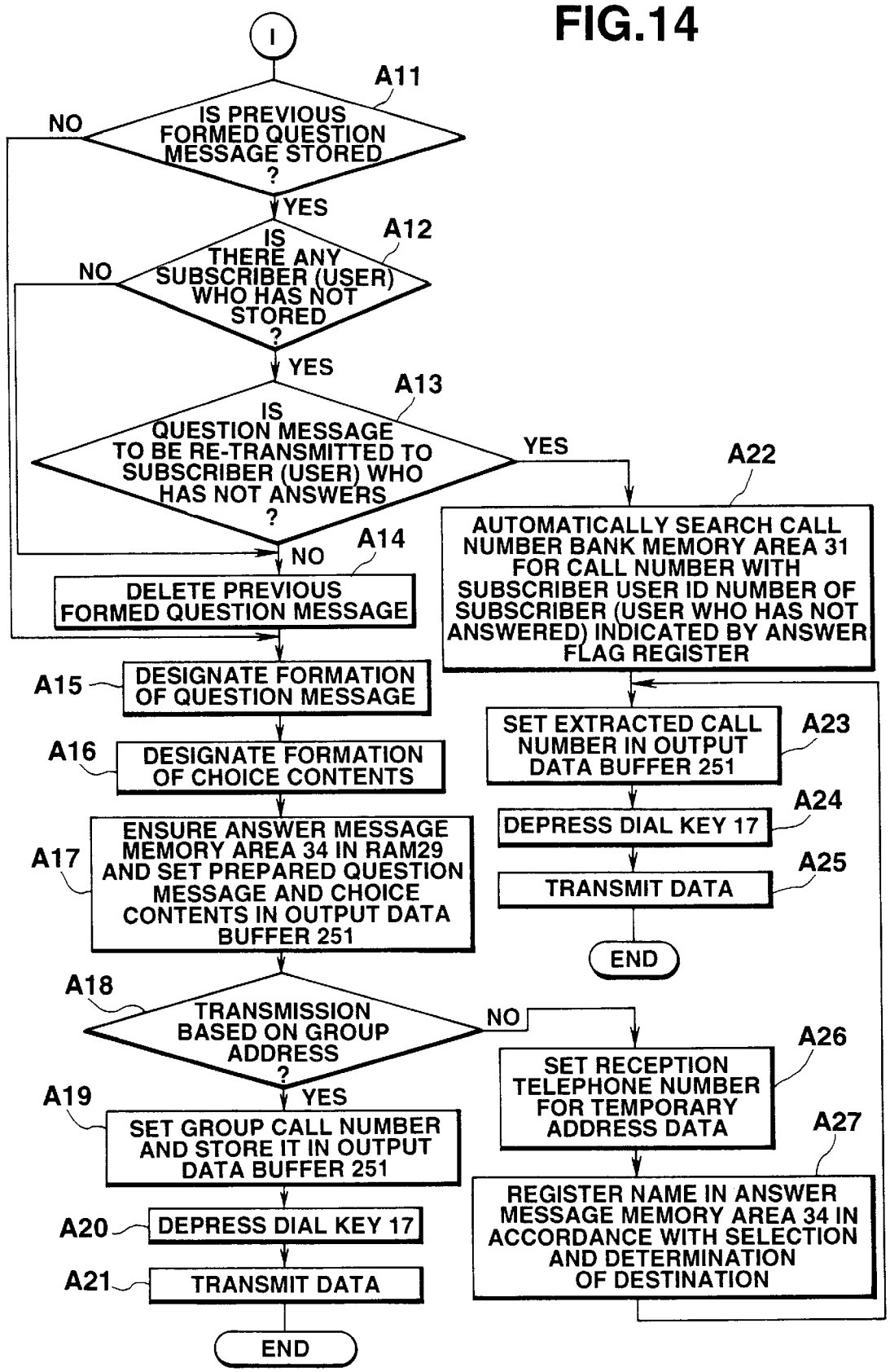
FIG. 14 is a flow chart showing the contents of transmission processing according to the first embodiment.
Figure 15:
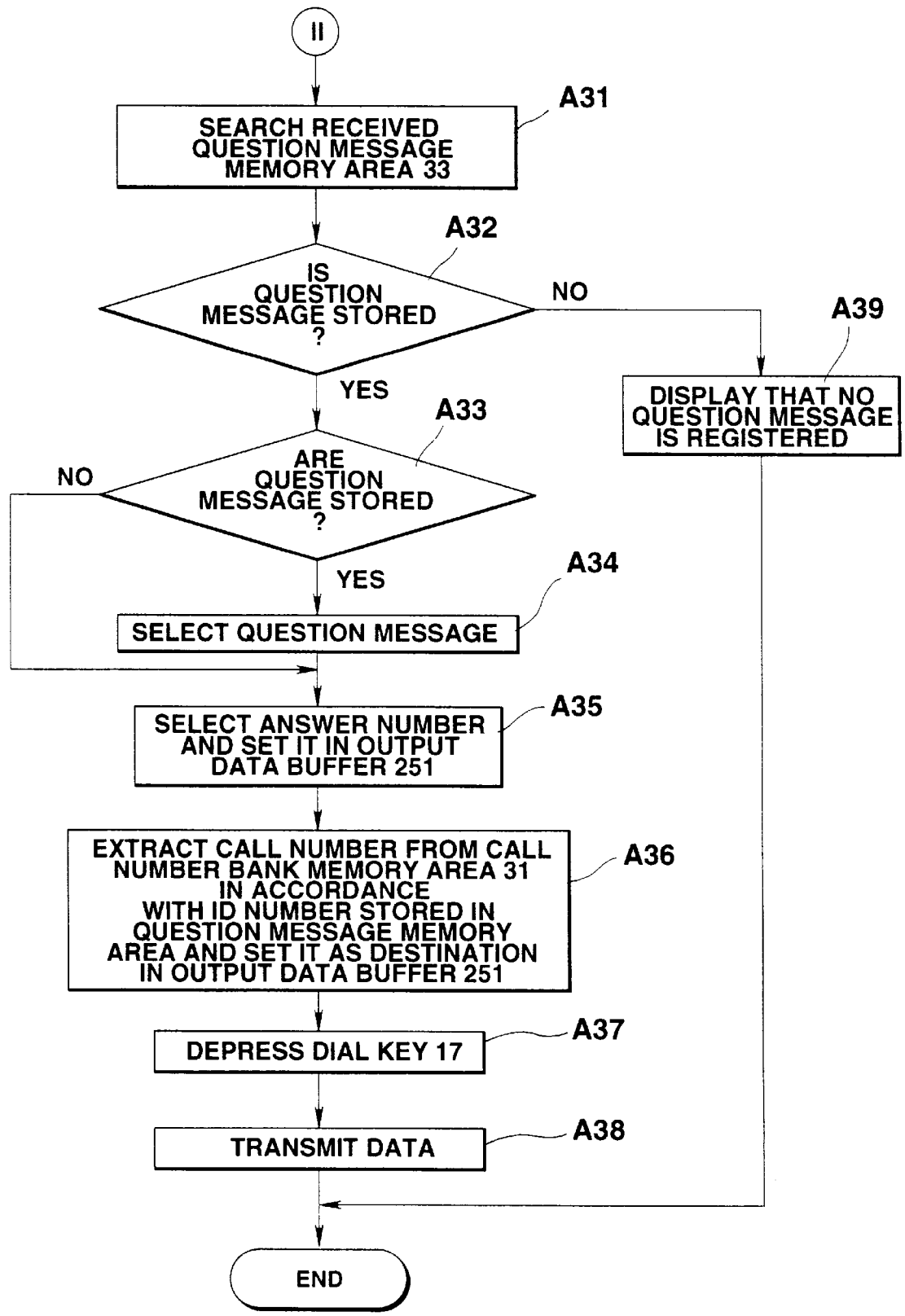
FIG. 15 is a flow chart showing the contents of transmission processing according to the first embodiment.

The paging receiver 1Z selects a message transmission mode and prepares/transmits a question message in accordance with the flow charts in FIGS. 13 to 15.

FIGS. 13 to 15 show the contents of message transmission processing performed by each of the paging receiver 1 (1Z and 1A to 1H). When the power switch (not shown) on a side surface of the case body 11 is turned on, a terminating standby mode is automatically set, and a message for urging selection of a message transmission mode is displayed on a portion of the liquid crystal display panel 13 (step A1).

This mode selection is performed in accordance with the operation of the "menu" key of the function keys 16. With this operation, the terminating standby mode can be switched to a telephone number bank mode of calling the above telephone number bank function and an electronic calculator mode of calling the electronic calculator function as well as the message transmission mode.

When a mode selecting operation is performed, it is checked whether the selected mode is the message transmission mode (step A2).

If the selected mode is not the message transmission mode, the selected mode is started to execute the corresponding processing (step A8). If the selected mode is the message transmission mode, the liquid crystal display panel 13 displays the titles of messages, i.e., "ORDINARY MESSAGE", "QUESTION MESSAGE", and "ANSWER MESSAGE" to a question message terminated in the past so as to urge the user to designate one of the titles, as shown in FIG. 18.

In this case, the liquid crystal display panel 13 displays a cursor C at the head portion of each of the titles of the above three types of messages. The user moves the cursor C in the vertical direction by operating the corresponding function keys 16 to select one of the messages, and designates confirmation of the selected message with the "#" key of the dial keys 15. The paging receiver 1Z then determines the contents of the operation (step A3).

If the confirmation of "QUESTION MESSAGE" is designated, the paging receiver 1Z refers to the prepared question message memory area 35 of the RAM 29 to check whether the previously prepared question message and choice contents are still stored (step A11).

If they are still stored, the paging receiver 1Z refers to the answer flag register, the group answer flag register, and the subscriber ID numbers at the positions in the answer message memory area 34 which correspond to this question message to check whether there is a subscriber who has not answered the question (step A12).

If YES in step A12, the liquid crystal display panel 13 is caused to display the number of subscribers who have not answered the question, and characters "TRANSMIT AGAIN?" and "DELETE?" for urging the user to select/designate an operation of transmitting the question again or an operation of deleting the question message data, as shown in FIG. 19. In this case, since a new question message is prepared, the user decides to select/designate "DELETE" upon moving the cursor C thereto.

If, for example, "DELETE?" is selected in response to this display, this selection is determined (step A13). The question message and the choice contents stored in the prepared question message memory area 35 of the RAM 29, and the corresponding answer messages stored in the answer message memory area 34 are deleted (step A14).

After the data in the prepared question message memory area 35 and the answer message memory area 34 are deleted, or the paging receiver 1Z determines in step A11 that the previously prepared question message data is not stored in the prepared question message memory area 35, the formation of a question message is designated (step A15).

In this case, in inputting letters used to prepare a question message, first, an alphanumeric character input mode is set by depressing the "ALPHANUM" key, and then two-digit numbers corresponding to the positions of the desired letters are input by depressing the corresponding keys of the dial keys 15. When, for example, "N" is to be input, the "ALPHANUM" key is depressed and the "1" key and the "3" key are sequentially depressed, and the cursor C is moved to the right by operating the right cursor key of the function keys 16 to confirm the selection.

The user prepares a question message by sequentially inputting letters, symbols, numerical values, and the like, and designates confirmation of the question message by operating, e.g., the lower cursor key of the function keys 16. With this operation, the paging receiver 1Z stores the prepared question message in the prepared question message memory area 35, and designates formation of choice contents as answers to this question (step A16).

In preparing answer choices, the user prepares choice contents by an operation similar to the above operation, and operates the lower cursor key to perform a line feed operation so as to automatically add answer numbers to the answer choices. For the sake of descriptive convenience, three choices are set.

The user sequentially prepares choice contents by inputting letters, numerical values, symbols, and the like and operating the lower cursor key for a line feed operation. When the user consecutively operates the "#" 11 key of the dial keys 15 twice upon preparing and confirming the three choice contents as shown in FIG. 20, the paging receiver 1Z determines the completion of the formation of one question message and the corresponding choice contents, and stores them in the prepared question message memory area 35. The paging receiver 1Z also ensures an area for answer data corresponding to the prepared question message in the answer message memory area 34 of the RAM 29, and sets the prepared question message and the choice contents in the output buffer 251 (step A17).

Subsequently, in order to set destinations of the prepared question message, the paging receiver 1Z performs a display operation to urge the user to determine whether to perform batch transmission using group address data or to select a plurality of destinations by using call number data stored in the call number bank memory area 31 so as to perform batch transmission using temporary address data. The paging receiver 1Z determines the determination contents in accordance with the operation designation performed by the user (step A18).

If it is determined in step A18 in accordance with the operation designation performed by the user that batch transmission of the prepared question message is performed by the group call method using the temporary address data, the paging receiver 1Z sets a reception telephone number for the center 4 which designates the group call method using the temporary address data (step A26).

If the user does not select batch transmission using the group address data but operates a cursor key of the function keys 16 to select a plurality of destinations from the group and perform batch transmission using the temporary address data, the paging receiver 1Z determines this determination and sets a reception telephone number for the temporary address data. In accordance with the selected contents, subscriber ID numbers corresponding to the subscriber names are sequentially registered in the ensured area in the answer message memory area 34 (step A27).

Figure 21:
FIG. 21 is a view showing a display state in an operation according to the first embodiment.

FIG. 21 shows a display on the liquid crystal display panel 13 of the paging receiver 1Z in step A27. Referring to FIG. 21, the symbol "●" indicates that batch transmission using the temporary address data is selected. In addition, "SAITO", "OISHI", "MURAKAMI", "YASHIKI", ..., the names of the users of the paging receivers 1A to 1H in the group which are registered in the call number bank memory area 31 in FIG. 9, are displayed.

The symbols "●" indicate that "SAITO", "OISHI", and "YASHIKI" are selected as destinations, and the cursor C also indicates that there are other call number data in the call number bank memory area 31. In this case, flag "1" is set in each of the transmission designation flag register portions of the call number bank memory area 31 which correspond to the selected subscriber names.

When destinations are selected and determined thereafter, the subscriber ID numbers indicated by flags "1" set in the transmission designation flag register portions of the call number bank memory area 31 are registered in the corresponding portions of the answer message memory area 34, as described above.

FIG. 12A shows a state of the answer message memory area 34 at this time. As shown in FIG. 12A, subscriber ID numbers "0000", "1111", and "3333" corresponding to the above subscriber names "SAITO", "OISHI", and "YASHIKI" are set in a subscriber ID number register 53. In this case, no flags in a answer flag register 51 and a group answer flag register 52 are set, and hence "0"s are set. In addition, no data are written in an answer number flag register 54 and a group answer register 55. Subsequently, the call number bank memory area 31 is automatically searched with the subscriber ID numbers stored in the subscriber ID number register 53 of the subscriber ID number register 53. As a result, the call number data of the destinations are extracted and set in the output buffer 251 (step A23).

The user depresses the dial transmission key 17 of the paging receiver 1Z while keeping the loudspeaker 18 in contact with the transmitter of the telephone terminal 2 such as a push-phone as shown in FIG. 2 (step A24). With this operation, the paging receiver 1Z converts the reception telephone number for the group call method using the temporary address data, the prepared question message, and the choice contents into a DTMF (Dual Tone Multi Frequency) signal, and outputs/transmits the signal (step A25).

Upon reception of this DTMF signal, on the basis of the above communication scheme, the center 4 on the paging service side adds, to the specific transmission destination call number in the group, the temporary address data and simplified instruction vector data for designating writing of frame number data with which the temporary address data is transmitted, and causes the transmission base stations 5 and 6 to transmit the resultant sum signal together with the question message and the answer choices, thereby calling the selected designations in the group.

With the above processing, the transmission processing of the question message data from the paging receiver 1Z to the paging receivers 1A, 1B, and 1D is completed.

If the paging receiver 1Z determines in step A3 that formation of a normal message which expects no answer from the reception side is designated, the paging receiver 1Z prepares a message in accordance with an operation performed by the user (step A4), and sets the message in the output buffer 251 (step A5). Thereafter, the user depresses the dial transmission key 17 of the paging receiver 1Z while keeping the loudspeaker 18 in contact with the transmitter of the telephone terminal 2 such as a push-phone as shown in FIG. 2 (step A6). With this operation, the paging receiver 1Z converts call numbers for calling paging receivers as destinations and the prepared normal message data into a DTMF signal, and outputs/transmits the signal (step A7).

If the paging receiver 1Z determines in step A18 in accordance with a designation operation performed by the user that the destinations of the question message are based on the group address data, and the message is to be transmitted to all the paging receivers in the group, the paging receiver 1Z sets a group call number corresponding to the group address data for calling all the paging receivers, in which the group address is registered, in the output buffer 251 (step A19). The user then depresses the dial transmission key 17 of the paging receiver 1Z while keeping the loudspeaker 18 in contact with the transmitter of the telephone terminal 2 such as a push-phone as shown in FIG. 2 (step A20). With this operation, the paging receiver 1Z outputs/transmits the group call number and the prepared question message data as a DTMF signal (step A21).

In this case, the contents of the actually transmitted DTMF signal include the group call number for calling all the paging receivers in the group, the question message, and the choice contents.

Assume that the previously prepared question message data is still stored in the prepared question message memory area 35 of the RAM 29, and there is a subscriber who has not answered this question message.

In this state, if it is determined in step A13 in accordance with a designation operation performed by the user that the question message data is to be transmitted again to the subscriber who has not answered the question message, i.e., "TRANSMIT AGAIN?" is selected/designated in the display state shown in FIG. 19, the call number bank memory area 31 is automatically searched with the subscriber ID number in the answer message memory area 34 which corresponds to a portion of the answer flag register 51 in which flag "1" is not set, and the call number data of the subscriber who has not answered is extracted (step A22). Thereafter, the processing in step A23 and the subsequent steps is executed.

Figure 16:
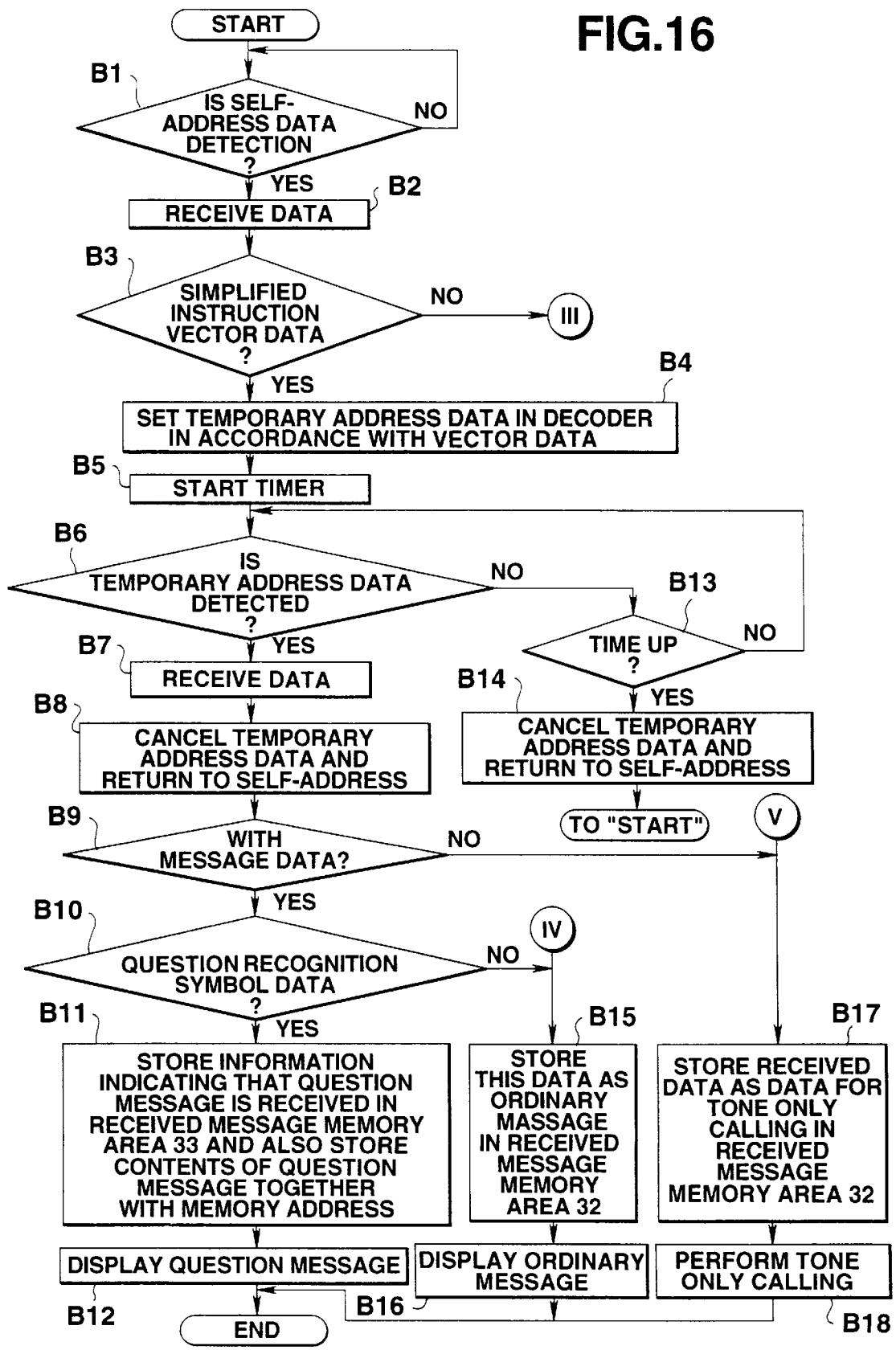
FIG. 16 is a flow chart showing the contents of terminating processing according to the first embodiment.
Figure 17:
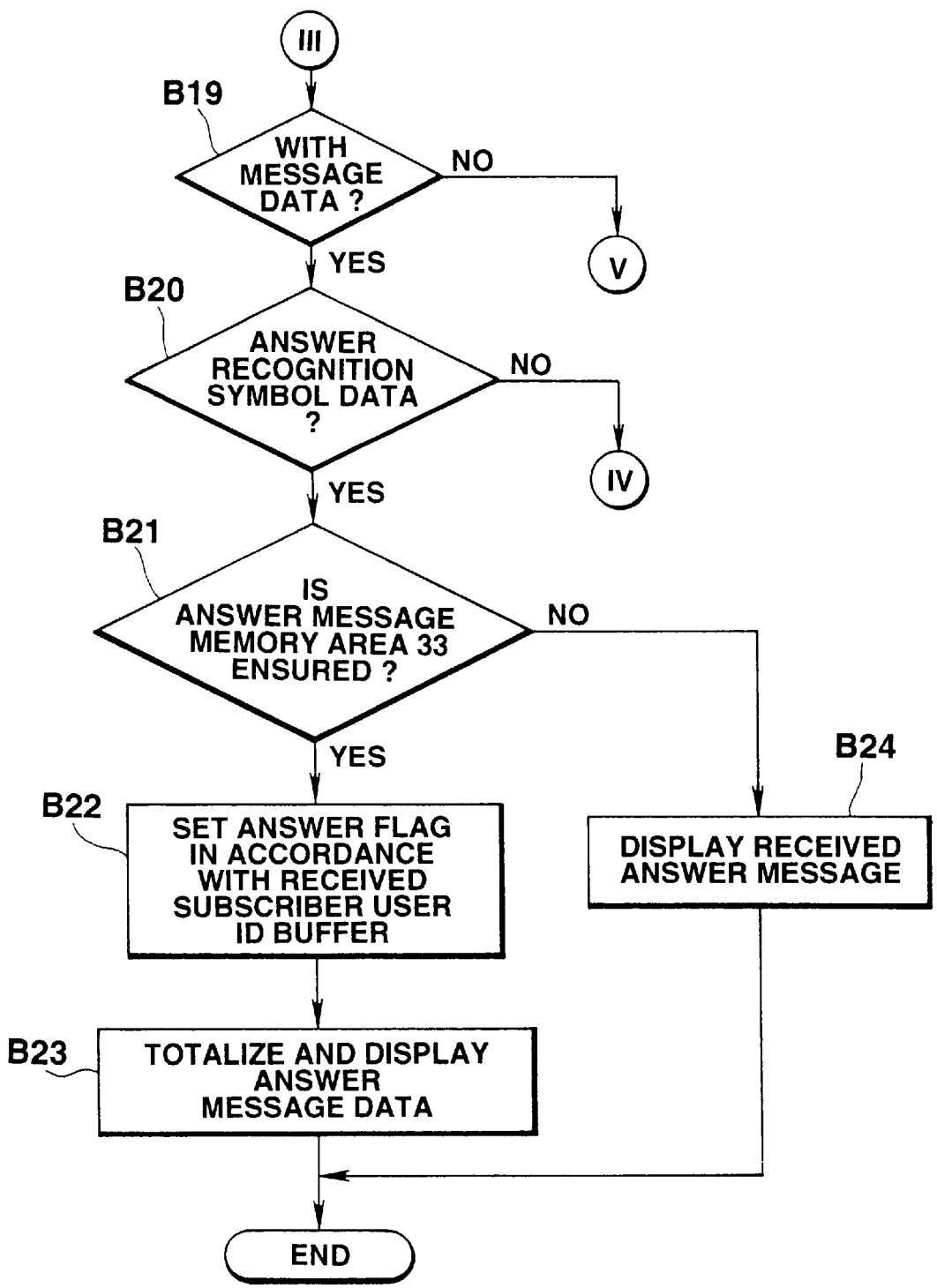
FIG. 17 is a flow chart showing the contents of terminating processing according to the first embodiment.

Question message terminating processing performed by the paging receivers 1A, 1B, and 1D will be described next with reference to the flow charts in FIGS. 16 and 17.

In this processing, each of the above paging receivers intermittently and repeatedly waits for detection of the self-address data stored in the ID-ROM 23 upon a calling operation (step B1). When called, the paging receiver receives data following the selfaddress data (step B2).

The paging receiver then checks whether the received data includes simplified instruction vector data (step B3).

If it is determined that the received data includes the simplified instruction vector data, the control section 25 decodes temporary address data designated by this simplified instruction vector data and frame number data with which the temporary address data is transmitted, and writes/sets the set temporary address data and the frame number data with which the temporary address data is transmitted in the address and frame registers (not shown) of the decoder section 24 (step B4). The control section 25 then starts the internal timer (step B5).

The decoder section 24 repeatedly checks whether the set temporary address data is detected with the designated frame number, and whether the count value of the started timer has become a predetermined period of time (four minutes), thereby waiting for detection of a calling operation using the temporary address data within the predetermined period of time (steps B6 and B13).

If it is determined in step B13 that the count value of the started timer has become the predetermined period of time without detection of a calling operation using the temporary address data, it is determined that termination of this temporary address data is not detected. The paging receiver then resets the temporary address data and the frame number data set in the decoder section 24, and is automatically returned to the normal calling standby state based on the self-address data and the self-frame number (step B14).

If the temporary address data set in step B6 is detected with the decoded frame number within the predetermined period of time, the paging receiver receives data following the temporary address data (step B7), cancels the temporary address data set in the decoder section 24, and is automatically returned to the standby state for the reception of the self-address and the self-frame (step B8).

It is then checked whether the data received in step B7 includes message data (step B9).

If it is determined that the received data includes no message data, it is determined that only a calling operation has been performed. The paging receiver stores the termination date data in the received message memory area 32 of the RAM 29 together with an address (step B17). Thereafter, the paging receiver notifies the calling operation by using of the following set means: an alarm sound produced by the loudspeaker 18, flickering of the LED lamp 14, and vibrations produced by the vibrator 30 (step B18).

It is determined that the data received in step B9 includes message data, it is then checked whether the message data includes question recognition symbol data, i.e., the message data is a question message (step B10).

It is determined that the message data includes no question recognition symbol data, since the message data is not a question message but is a normal message, the contents of the message and the termination date data are stored in the received message memory area 32 of the RAM 29 together with the address (step B15). Thereafter, the paging receiver notifies the calling operation by using of the following set means: an alarm sound produced by the loudspeaker 18, flickering of the LED lamp 14, and vibrations produced by the vibrator 30, and causes the liquid crystal display panel 13 to display the terminated normal message (step B16).

If it is determined in step B10 that the message data includes question recognition symbol data, it indicates that the message data is a question message. The paging receiver therefore stores information indicating that the question message is terminated and the termination date data in the received message memory area 32 of the RAM 29 together with an address, and also stores the contents of the question message and answer choice contents in the terminated question message memory area 33 together with the address number in the received message memory area 32 (step B11).

FIG. 11 shows the terminated question message memory area 33 in which a plurality of question message contents are stored in this manner. As described above, the terminated question message memory area 33 is designed to store a plurality of sets of data, each a including an address 41, a subscriber ID number 42, question message contents 43, and choice contents 44. The address 41 indicates an address number in the received message memory area 32 which corresponds to the question message.

The subscriber ID number 42 is the subscriber ID number of the subscriber who has transmitted this question message, and this ID number is added to the question message. The subscriber who has transmitted the question message can be known by searching the call number bank memory area 31 with this subscriber ID number.

Figure 23:
FIG. 23 is a view showing a display state in an operation according to the first embodiment.

After the question message is stored in the terminated question message memory area 33 in this manner, the paging receiver notifies the calling operation by using of the following set means: an alarm sound produced by the loudspeaker 18, flickering of the LED lamp 14, and vibrations produced by the vibrator 30, and also causes the liquid crystal display panel 13 to display the question message by using the question message data stored in the terminated question message memory area 33, as shown in FIG. 23 (step B12).

Referring to FIG. 23, the liquid crystal display panel 13 displays "WHERE WILL WE MEET?" as the contents of the question message together with "AOKI" which is the name of the subscriber who has transmitted the data. "1. SHINJUKU", "2. SHIBUYA", and "3. ROPPONGI" as the choice contents are displayed below the above data.

Each of the paging receivers 1A, 1B, and 1D, which has received the question message from the paging receiver 1Z, performs a display operation like the one shown in FIG. 23. The above description is associated with transmission and reception of a question message within the group. Of these paging receivers 1A, 1B, and 1D, the paging receivers 1A and 1B prepare answer messages and transmit them to the paging receiver 1Z, and the paging receiver 1Z terminates these answer messages and performs totalization processing on the basis of the contents of the answer messages. This operation will be described below.

Assume that the paging receiver 1D transfers this question message to all the paging receivers 1E to 1H constituting another group different from the above group by using a group address, and returns answer messages obtained from the paging receivers 1E to 1H to the paging receiver 1Z, together with its own answer message, as shown in FIG. 3.

In each of the paging receivers 1A and 1B, when the user selects/designates, from the displayed state in FIG. 18, to return the answer message in the transmission processing shown in FIGS. 13 to 15, this selection/designation is determined (steps A1 to A3). Each paging receiver then searches the terminated question message memory area 33 of the RAM 29 (step A31) to check whether the question message is stored (step A32).

If the question message is not stored, the information that the question message is not stored is displayed on the liquid crystal display panel 13 with characters like "QUESTION MESSAGE IS NOT TERMINATED" (step A39).

If the question message data is stored in the terminated question message memory area 33, it is checked whether a plurality of question message data are stored (step A33).

If a plurality of question message data are stored, each paging receiver causes the liquid crystal display panel 13 to display a list of the contents of the question messages and sender names (subscriber names) obtained by searching the call number bank memory area 31 with the subscriber ID numbers, thereby designating selection of a question message (step A34). The paging receiver causes the liquid crystal display panel 13 to display the question message selected by a designation operation performed by the user and the corresponding question number, as shown in FIG. 21.

While displaying the selected question message and the corresponding question number on the liquid crystal display panel 13 in this manner, the paging receiver designates formation of an answer message (step A35).

When an answer message is prepared upon the designation operation performed by the user, the paging receiver 1Z searches the call number bank memory area 31 on the basis of the subscriber ID number of the question message which is stored in the terminated question message memory area 33. The paging receiver then sets flag "1", extracts the corresponding call number, and sets it in the output buffer 251 (step A36).

When the user depresses the dial transmission key 17 while keeping the loudspeaker 18 of the paging receiver 1B (1A) in contact with the transmitter of the telephone terminal 2 such as a push-phone (step A37), the paging receiver 1B (1A) converts the call number for calling the destination and the answer message (answer number) selected from the above choice contents into a DTMF signal, and returns it to the paging receiver 1Z (step A38).

In this case, for example, the data configuration of the question message is "*8*41111*12". Of this data, "*8*4" at the first four digit positions is an answer recognition symbol; "1111" at the four succeeding digit positions, a subscriber ID number assigned to the paging receiver 1B as the sender of this answer message; "*1" at the next two digit positions, an individual answer ID number; and "2" at the last one digit position, the selected answer number.

If, therefore, the paging receiver 1A selects answer number "3" with respect to the same question message and returns it to the paging receiver 1Z, the data configuration of the answer message data is "*8*40000*13".

As described above, the user of the paging receiver 1D transfers the question message received from the paging receiver 1Z to all the paging receivers 1E to 1H constituting another group, and returns, together with its own answer message, the answer messages obtained from the paging receivers 1E to 1H to the paging receiver 1Z.

Transmission processing performed by the paging receiver 1D with respect to the paging receivers 1E to 1H is almost the same as that performed by the paging receiver 1Z, except that the paging receiver 1D performs batch transmission with respect to the paging receivers 1E to 1H by using a group address data. For this reason, a description of this operation will be omitted.

In this case, the subscriber ID number of the sender of the question message transmitted to the paging receivers 1E to 1H is not "4444" but is "3333".

Upon reception of this question message, the paging receivers 1E to 1H prepare answer messages and return them to the paging receiver 1D. Since these receiving and returning operations of the paging receivers 1E to 1H are almost the same as those of the paging receivers 1A and 1B, a description thereof will be omitted.

Terminating processing performed by the paging receiver 1D which receives the answer messages from the paging receivers 1E to 1H will be described below with reference to FIGS. 16 and 17.

The paging receiver ID intermittently and repeatedly waits for detection of the self-address data stored in the ID-ROM 23 upon a calling operation (step B1). When called, the paging receiver 1D receives data following the self-address data (step B2).

The paging receiver 1D checks whether the received data includes simplified instruction vector data (step B3). In this case, the paging receiver 1D is to terminate the answer messages from the paging receivers 1E to 1H, and there is no possibility that the answer messages to the question are returned to a plurality of paging receivers. It is therefore determined that no simplified instruction vector data for designating temporary address data is terminated, and the flow does not advances to step B4. It is then checked whether the received data includes message data (step B19).

If it is determined that no message data is included, it is determined that only a calling operation is performed, and the flow advances to step B17. If it is determined that message data is included, it is checked whether the message data includes answer recognition symbol data, i.e., the message is an answer message (step B20).

If it is determined that the message data includes no answer recognition symbol data, since it indicates that the message data is a normal message, the flow advances to step B15. If it is determined that the message data includes answer recognition symbol data, since it indicates that the message data is an answer message, it is checked whether a corresponding area is ensured in the answer message memory area 34 of the RAM 29 (step B21). Thereafter, flag "1" is set in the corresponding portion of the answer flag register 51 on the basis of the subscriber ID number in the received answer message (step B22).

If it is determined in step B21 that the question message corresponding to the terminated answer message is not stored in the prepared question message memory area, and the corresponding answer message area is not ensured in the answer message memory area 34, the terminated answer message is directly displayed on the liquid crystal display panel 13 (step B24).

Subsequently, in accordance with the answer number following the answer recognition symbol "*1" in the answer message data, the paging receiver sets flag "1" in a portion of the answer number flag register 54 which corresponds to the portion, of the answer flag register 51 of the answer message memory area 34, in which the above flag is set. The paging receiver then totalizes the answer states in the areas ensured in the answer message memory area 34, i.e., the number of set flags "1" corresponding to the respective answer numbers, and causes the liquid crystal display panel 13 to display the totalization result (step B23).

Assume that three paging receivers of the paging receivers 1E to 1H select answer number "1" with respect to the question message, and the remaining one paging receiver selects answer number "3".

The paging receiver 1D returns the totalization result displayed on the liquid crystal display panel 13 to the paging receiver 1Z together with its own question message on the basis of the data returned from the paging receivers 1E to 1H, as group answers of the paging receivers 1E to 1H. If, for example, the user of the paging receiver 1D selects answer number "3" with respect to the question message, processing associated with the returning operation of the paging receiver ID is performed in the following manner.

As the answer messages returned from the paging receiver 1D to the paging receiver 1Z in the transmission processing shown in FIGS. 13 to 15, data incorporating the answer messages as group answers and the individual answer message is continuously returned. The data configuration of this data is "*8*43333*2132031*13". Of this data, "*8*4" at the first four digit positions is an answer recognition system; "3333" at the four succeeding digit positions is the subscriber ID number assigned to the paging receiver 1D as the sender of the answer message, "*2" at the next two digit positions is an answer ID symbol identifying group answers, "132031" at the next six digit positions indicates that three subscribers selected answer number "1", no subscriber selected answer number "2", and one subscriber selected answer number "3", "*1" at the next two digit positions is the answer recognition symbol of the user of the paging receiver 1D, and "2" at the last one digit position is the answer number of the paging receiver 1D.

Finally, terminating processing to be performed when the paging receiver 1Z is to terminate answer messages from the paging receivers 1B and 1D of the paging receivers 1A, 1B, and 1D will be described.

The paging receiver 1Z intermittently and repeatedly waits for detection of the self-address data stored in the ID-ROM 23 upon a calling operation (step B1). When called, the paging receiver 1Z receives data following the self-address data (step B2).

The paging receiver 1Z checks whether the received data includes simplified instruction vector data (step B3). In this case, the paging receiver 1Z is to terminate the answer messages from the paging receivers 1A, 1B, and 1D, and there is no possibility that the answer messages to the question are returned to a plurality of paging receivers. It is therefore determined that no simplified instruction vector data for designating temporary address is terminated, and the flow does not advance to step B4. It is then checked whether the received data includes message data (step B19).

If it is determined that message data is included, it is checked whether the message data includes answer recognition symbol data, i.e., the message is an answer message (step B20).

If it is determined that the message data includes answer recognition symbol data, since it indicates that the message data is an answer message, the paging receiver 1Z checks whether a corresponding area is ensured in the answer message memory area 34 of the RAM 29 (step B21). Thereafter, the paging receiver Z1 sets flag "1" in the corresponding portion of the answer flag register 51 in accordance with the subscriber ID number in the received answer message data (step B22).

If an answer number follows the answer ID symbol "*1", in the answer message data, the paging receiver 1Z sets flag "1" in a portion of the answer number flag register 54 which corresponds to the portion, of the answer flag register 51 of the answer message memory area 34, in which the above flag is set. In addition, if an answer number follows group answer ID number "*2", the number of subscribers corresponding to the answer number is set in a portion of the group answer register 55 which corresponds to the portion, of the answer flag register 51 of the answer message memory area 34, in which the above flag is set. The paging receiver 1Z then totalizes the answer states in the areas ensured in the answer message memory area 34, i.e., the number of set flags "1" corresponding to the respective answer numbers in the answer number flag register 54 and the number of subscribers corresponding to the respective answer numbers in the group answer register 55, and causes the liquid crystal display panel 13 to display the totalization result (step B23).

FIGS. 12A to 12C show how data are stored in the answer message memory area 34 of the RAM 29 of the paging receiver 1Z which terminates answer messages from the paging receivers 1A, 1B, and 1D, as described above. FIGS. 22A to 22C show corresponding tables indicating the totalization results which are displayed on the liquid crystal display panel 13.

While no answer message is terminated from any one of the paging receivers 1A, 1B, and 1D as shown in FIG. 12A, "0"s are set in the answer flag register 51 and the group answer flag register 52 of the answer message memory area 34, and both the answer number flag register 54 and the group answer register 55 are kept blank.

In correspondence with this state, as shown in FIG. 22A, the liquid crystal display panel 13 has an individual answer area 61 and a group answer area 62, in which a table corresponding to answer numbers "1" to "3" is displayed. This table displays that the number of subscribers who have not answered is "3", and their names are "SAITO", "OISHI", and "YASHIKI".

These names can be obtained by searching the call number bank memory area 31 with subscriber ID numbers corresponding to portions of the answer flag register 51 of the answer message memory area 34 in which "0"s are set.

Assume that the paging receiver 1Z terminates an answer message from the paging receiver 1B, and the answer number in the message is "2". In this case, as shown in FIG. 12B, flag "1" is set in a portion of the answer flag register 51 of the answer message memory area 34 which corresponds to subscriber ID number "1111" corresponding to the paging receiver 1B, and flag "1" is set at the position of "2" in the answer number flag register 54.

In correspondence with this state, as shown in FIG. 22B, on the liquid crystal display panel 13, the number of subscribers who have not answered decreases to "2", and "OISHI" who has returned the answer message is moved to the position of answer number "2" as indicated by the arrow, with the number of subscribers in the corresponding portion being set to "1".

Subsequently, the paging receiver 1Z terminates an answer message from the paging receiver 1D. This answer message includes group answers from the group including the paging receivers 1E to 1H and an answer from the user of the paging receiver 1D, as described above. As shown in FIG. 12C, therefore, flags "1" are set in both portions of the answer flag register 51 and the group answer flag register 52 in the answer message memory area 34 which correspond to subscriber ID number "3333", corresponding to the paging receiver 1D. In addition, flag "1", is set at the position of "3" of the answer number flag register 54; "3" representing the number of subscribers is set at the position of "1" of the group answer register 55; "0" representing the number of subscribers is set in the position of "2"; and "1" representing the number of subscribers is set at the position of "3".

In correspondence with this state, as shown in FIG. 22C, on the liquid crystal display panel 13, the number of subscribers who have not answered decreases to "1", "YASHIKI" who has returned the answer message is moved to the position of answer number "3" in the individual answer area 61 as indicated by the arrow, with the number of subscribers in the corresponding portion being set to "1". At the same time, "YASHIKI" is moved to the group answer area 62 and displayed. In the group answer area 62, "4" is displayed as the number of subscribers of the group; "3", as the number of subscribers at answer number "1"; "0", as the number of subscribers at answer number "2"; and "1", as the number of subscribers at answer number "3".

At the position of "TOTAL" of the individual answer area 61 and the group answer area 62, "6" is displayed as the total number of answer messages terminated by the paging receiver 1Z; "3", as the number of subscribers at answer number "1"; "1", as the number of subscribers at answer number "2"; and "2", as the number of subscribers at answer number "3".

As described above, terminated answer messages are automatically totalized, and the totalization result is displayed in a readable form in accordance with changes in the number of terminated answer messages, as shown in FIGS. 22A to 22C. With this operation, the subscriber who has generated the question message can easily know the contents, tendency, and the like of answer messages to the question message. This system is therefore very useful.

In the first embodiment, choices are prepared as answers to a question message and are sent to subscribers, together with the question message, and the subscribers return numbers corresponding to the choice contents as answer messages. However, the present invention is not limited to this. For example, the subscribers who have received the question message may freely prepare answers and return them to the subscriber who has sent the question message. An arrangement for realizing such an operation will be described as the second embodiment of the present invention.

The second embodiment in which the present invention is applied to a paging receiver having a dial function will be described below with reference to the accompanying drawings.

Figure 1B:
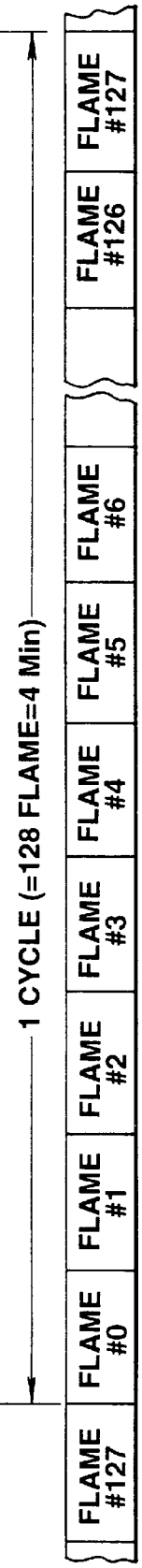
Figure 1C:
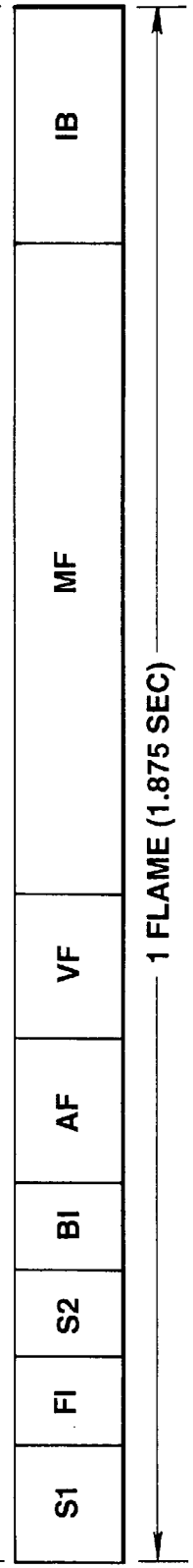

The manner of getting a paging service using paging receivers 1 (1Z, 1A to 1D, and 1E to 1H) according to the present invention is the same as that shown in FIG. 1. The outer appearance of each of the paging receivers 1 is the same as that shown in FIG. 4. The arrangement of electronic circuit is the same as that shown in FIG. 5. The arrangement of a character code matrix for a free message mode which is stored in a ROM is the same as that shown in FIG. 6 or 7. The same reference numerals in the second embodiment denote the same parts as in the first embodiment, and illustrations and a description thereof will be omitted.

FIG. 24 shows the memory map of a RAM 29 which is backed up by a power supply regardless of the ON/OFF state of the power switch to retain the stored contents.

The RAM 29 has a call number bank memory area 31, a prepared question message memory area 71 for storing prepared question messages, a received message memory area 72, a terminated question message memory area 73 for storing question messages, and an answer message memory area 74.

The call number bank memory area 31 is an area for storing data associated with a plurality of subscribers. Data corresponding to one subscriber consists of a transmission designation flag register, a subscriber ID number, a subscriber name, and the subscriber address which is the call number of the subscriber.

The prepared question message memory area 71 is an area for storing a plurality of sets of question message data. One set of question message data consists of a question number ("QST No." in FIG. 24) and the contents of a question message.

The received message memory area 72 is an area for storing a plurality of sets of data. One set of data has an address at which a terminated message is stored, the contents of the message, and the termination date.

The terminated question message memory area 73 is an area for storing a plurality of sets of data. One set of data has an address number in the memory which is set when a terminated question message is stored in the received message memory area 72, the subscriber ID number of a sender, a question number, and question message contents.

The answer message memory area 74 is an area for storing a plurality of sets of answer message data, each containing a question number, a subscriber ID number, and answer contents.

An operation of the embodiment having the above arrangement will be described next.

Assume that a question message is transmitted from a paging receiver 1Z carried by a user with a subscriber ID number "4444" and a subscriber name "AOKI" to a paging receiver 1A carried by a user with a subscriber ID number "0000" and a subscriber name "SAITO", a paging receiver 1B carried by a user with a subscriber ID number "1111" and a subscriber name "OISHI", and a paging receiver 1D carried by a user with a subscriber ID number "3333" and a subscriber name "YASHIKI" in the same group by batch transmission using temporary address data, and receives/totalizes answer messages to the question from the paging receivers 1A, 1B, and 1D by radio, as shown in FIG. 2. This operation will be described below.

Assume that the data contents shown in FIG. 9 are stored in the call number bank memory area 31 of the RAM 29 of the paging receiver 1Z in advance, and the data contents shown in FIG. 10 are stored in the call number bank memory area 31 of the paging receiver 1B.

Figure 27:
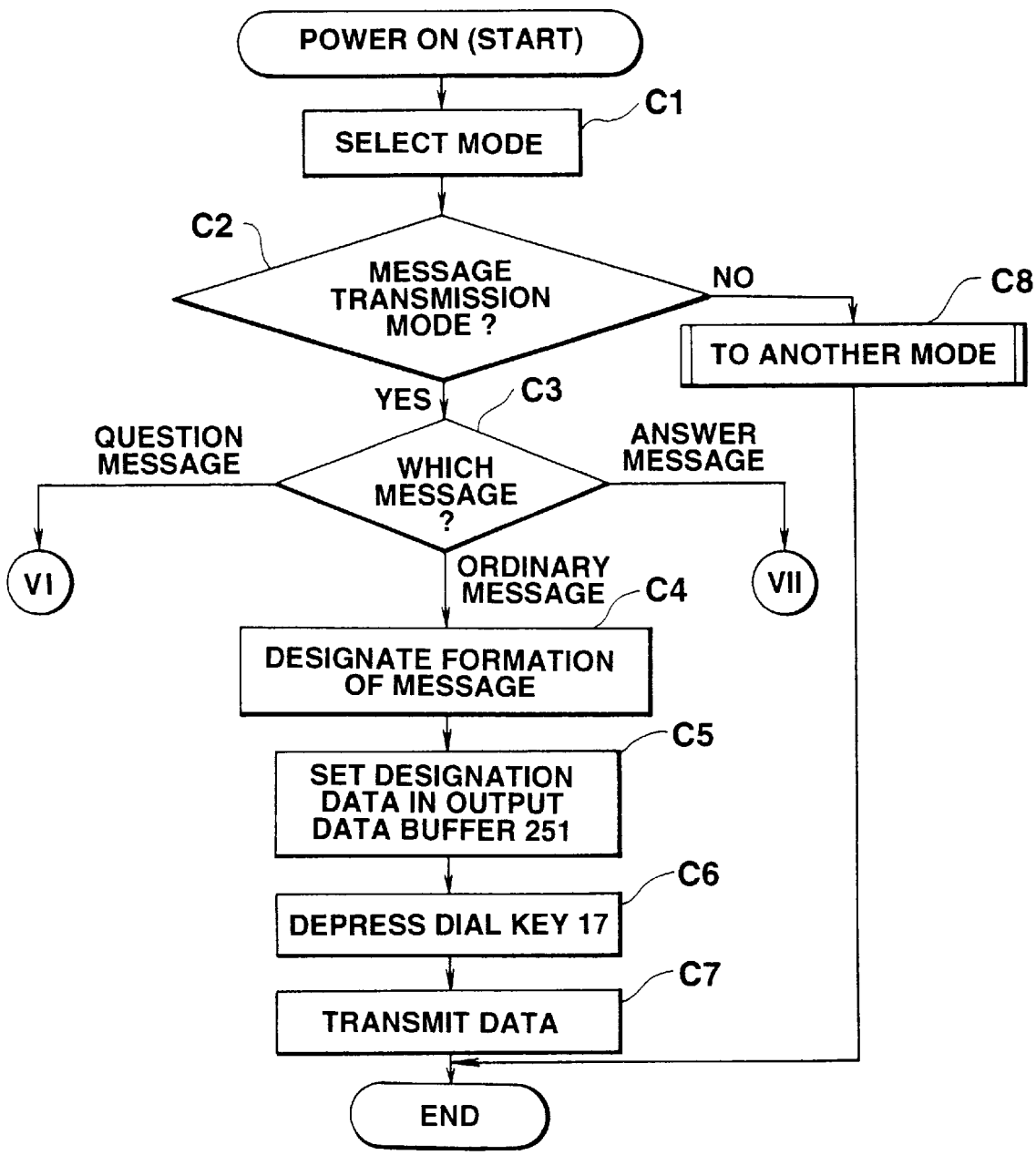
FIG. 27 is a flow chart showing the contents of transmission processing according to the second embodiment.
Figure 28:
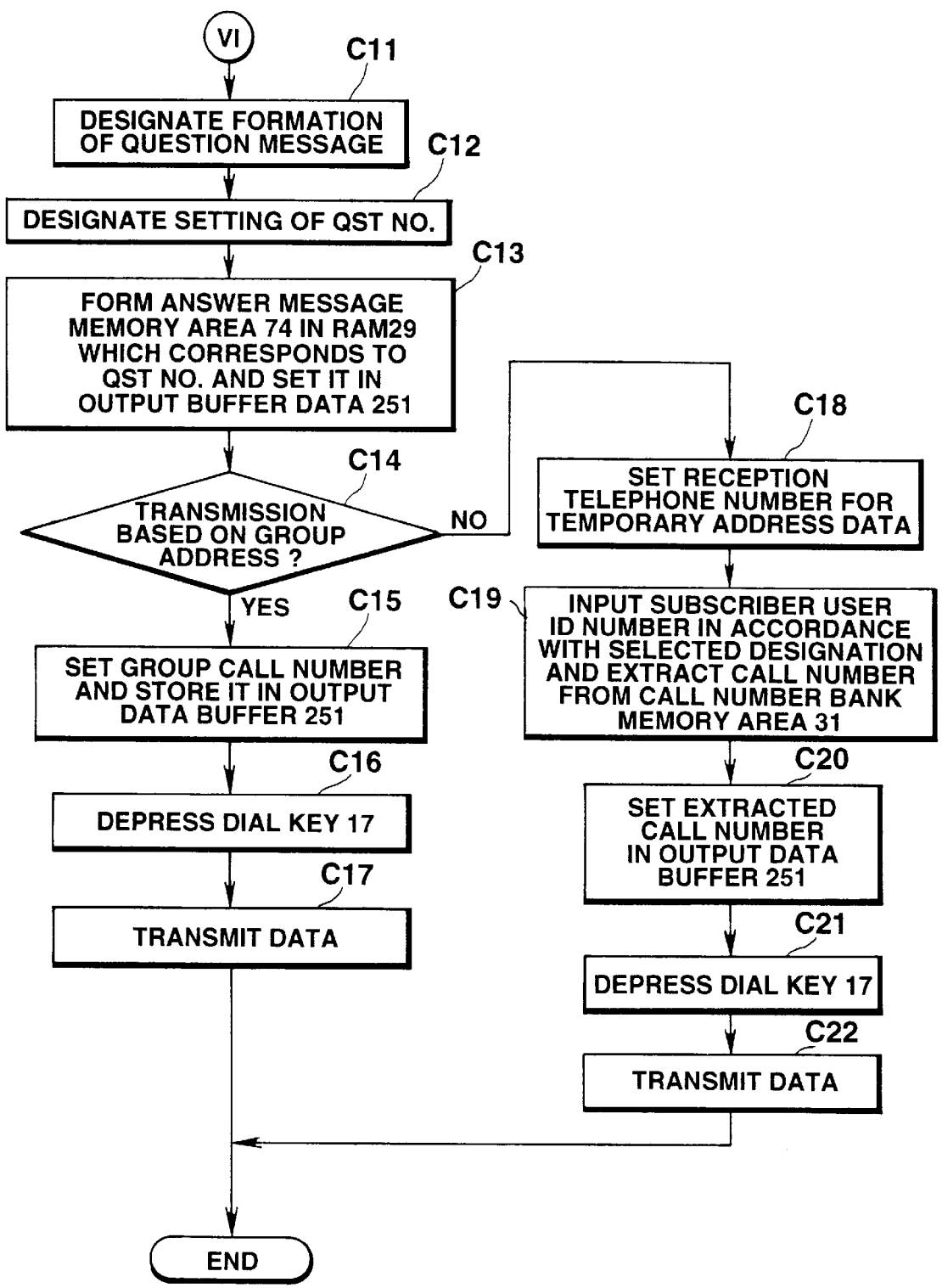
FIG. 28 is a flow chart showing the contents of transmission processing according to the second embodiment.
Figure 29:
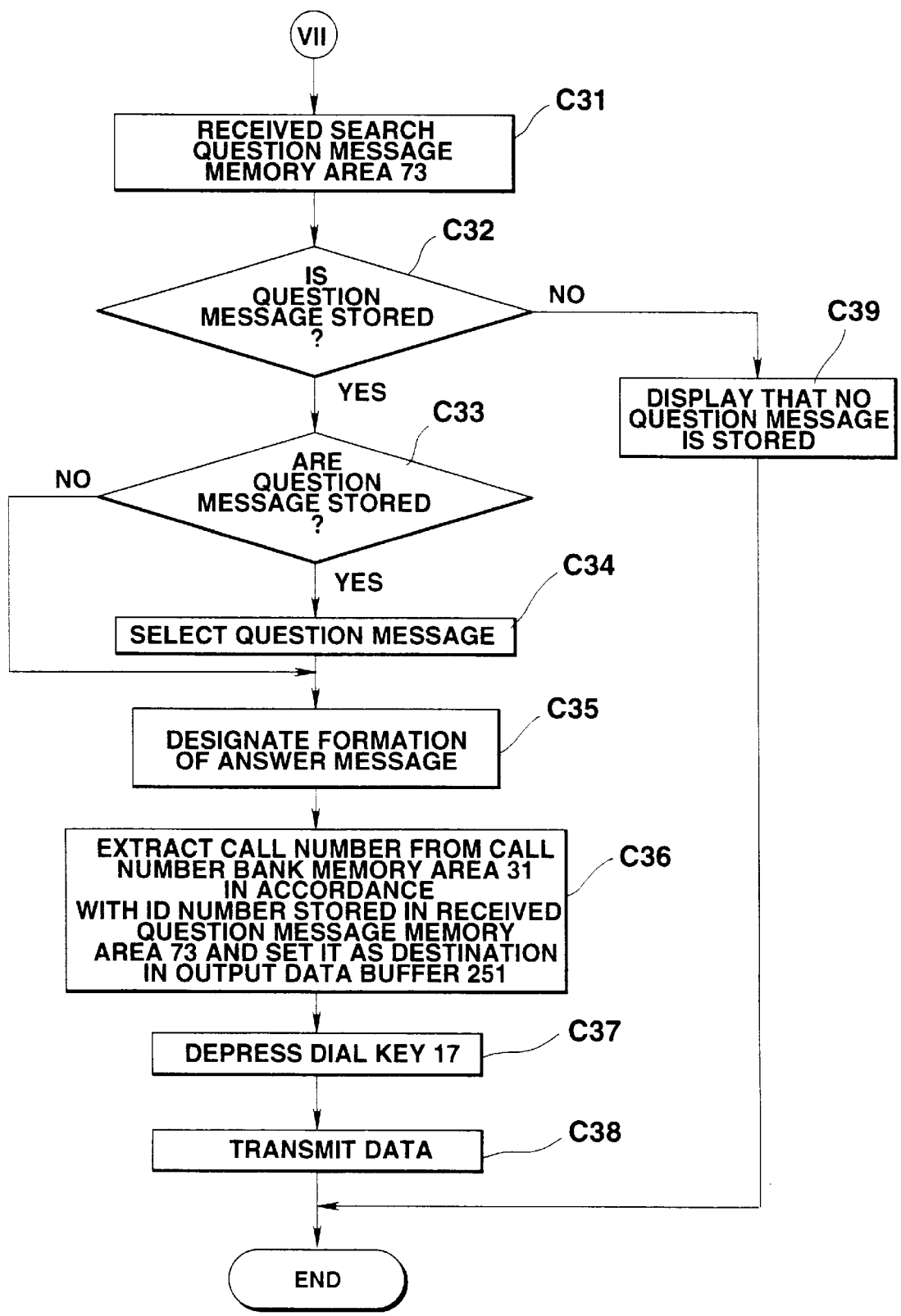
FIG. 29 is a flow chart showing the contents of transmission processing according to the second embodiment.

The paging receiver 1Z selects a message transmission mode, and prepares/transmits a question message in accordance with the flow charts in FIGS. 27 to 29.

FIGS. 27 to 29 show the contents of message transmission processing performed by the paging receivers 1 (1Z and 1A to 1H). When the power switch (not shown) on a side surface of a case body 11 is turned on, a terminating standby mode is automatically set, and a message for urging selection of a message transmission mode is displayed on a portion of the liquid crystal display panel 13 (step C1).

This mode selection is performed in accordance with the operation of a "menu" key of function keys 16. With this operation, the terminating standby mode can be switched to a telephone number bank mode of calling the above telephone number bank function and an electronic calculator mode of calling the electronic calculator function as well as the message transmission mode.

When a mode selecting operation is performed, it is checked whether the selected mode is the message transmission mode (step C2).

If the selected mode is not the message transmission mode, the selected mode is started to execute the corresponding processing (step C8). If the selected mode is the message transmission mode, the liquid crystal display panel 13 displays the titles of messages, i.e., "ORDINARY MESSAGE", "QUESTION MESSAGE", and "ANSWER MESSAGE" to a question message terminated in the past so as to urge the user to designate one of the titles, as shown in FIG. 18.

In this case, the liquid crystal display panel 13 displays a cursor C at the head portion of each of the titles of the above three types of messages. The user moves the cursor C in the vertical direction by operating the corresponding function keys 16 to select one of the messages, and designates confirmation of the selected message with a "#" key of dial keys 15. The paging receiver 1Z then determines the contents of the operation (step C3).

If the confirmation of "QUESTION MESSAGE" is designated, the paging receiver 1Z prepares a question message in accordance with a designation operation performed by the user (step C11).

In this case, in inputting the letters used to prepare a question message, first, an alphanumeric character input mode is set by depressing the "ALPHANUM" key, and then two-digit numbers corresponding to the positions of the desired letters are input by depressing the corresponding keys of the dial keys 15. When, for example, "N" is to be input, the "ALPHANUM" key is depressed and then the "1" key and the "3" key are sequentially depressed, and the cursor C is moved to the right by operating the right cursor key of the function keys 16 to confirm the selection.

The user prepares a question message by sequentially inputting letters, symbols, numerical values, and the like, and designates confirmation of the question message by operating, e.g., the lower cursor key of the function keys 16. Thereafter, a question number corresponding to the prepared question message data is set (step C12).

Setting of this question number is also performed by operating the dial keys 15 and the lower cursor key of the function keys 16.

Figure 32:
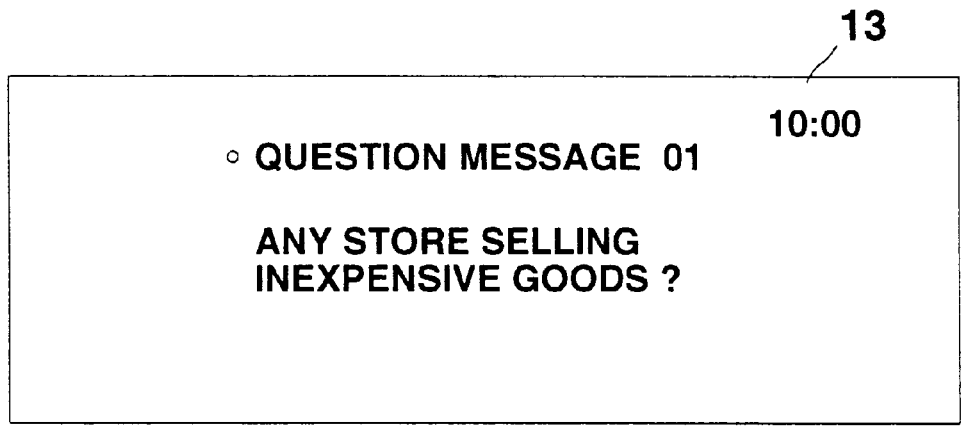
FIG. 32 is a view showing a display state in an operation according to the second embodiment.

FIG. 32 shows how the question message prepared in this manner is displayed on the liquid crystal display panel 13. In this case, question number "01" is set for question message "IS ANY STORE SELLING INEXPENSIVE GOODS?". When the user consecutively operates the "#" key of the dial keys 15 twice upon confirming these data, the paging receiver 1Z determines that the formation of one question message and setting of the question number are completed, and stores the data in the prepared question message memory area 71. In addition, the paging receiver 1Z ensures an area for this question message in the answer message memory area 74 of the RAM 29, and sets the prepared question message and the question number in the output buffer 251 (step C13).

Subsequently, in order to set destinations of the prepared question message, the paging receiver 1Z performs a display operation to urge the user to determine whether to perform batch transmission using group address data or to select a plurality of destinations by using call number data stored in the call number bank memory area 31 so as to perform batch transmission using temporary address data. The paging receiver 1Z determines the determination contents in accordance with the operation designation performed by the user (step C14).

If it is determined in step C14 in accordance with the operation designation performed by the user that batch transmission of the prepared question message is performed by the group call method using the temporary address data, the paging receiver 1Z sets a reception telephone number for a center 4 which designates the group call method using the temporary address data (step C18).

If the user does not select batch transmission using the group address data but operates a cursor key of the function keys 16 to select a plurality of destinations from the group and perform batch transmission using the temporary address data, the paging receiver 1Z determines this determination and sets a reception telephone number for the temporary address data. In accordance with the selected contents, subscriber ID numbers corresponding to the subscriber names are sequentially registered in the ensured area in the answer message memory area 74 (step C19).

FIG. 21 shows a display on the liquid crystal display panel 13 of the paging receiver 1Z in step A27. Referring to FIG. 21, the symbol "●" indicates that batch transmission using the temporary address data is selected. In addition, "SAITO", "OISHI", "MURAKAMI", "YASHIKI", . . . , the names of the users of the paging receivers 1A to 1H in the group which are registered in the call number bank memory area 31 in FIG. 9, are displayed.

The symbols "●" indicate that "SAITO", "OISHI", and "YASHIKI" are selected as destinations, and the cursor C also indicates that there are other call number data in the call number bank memory area 31. In this case, flag "1" is set in each of the transmission designation flag register portions of the call number bank memory area 31 which correspond to the selected subscriber names.

When destinations are selected and determined thereafter, the call number bank memory area 31 is automatically searched with the subscriber ID numbers indicated by flags "1" set in the transmission designation flag register portions of the call number bank memory area 31 to extract the call number data of the destinations. The data are then set in the output buffer 251 (step C20).

The user depresses the dial transmission key 17 of the paging receiver 1Z while keeping a loudspeaker 18 in contact with the transmitter of a telephone terminal 2 such as a push-phone as shown in FIG. 2 (step C21).

With this operation, the paging receiver 1Z converts the reception telephone number for the group call method using the temporary address data, the call numbers for calling the destinations, and the prepared question message data into a DTMF (Dual Tone Multi Frequency) signal, and outputs/transmits the signal (step C22).

Upon reception of this DTMF signal, on the basis of the above communication scheme, the center 4 on the paging service side adds, to the specific transmission destination call number in the group, the temporary address data and simplified instruction vector data for designating writing of frame number data with which the temporary address data is transmitted, and causes transmission base stations 5 and 6 to transmit the resultant sum signal together with the question message and the answer choices, thereby calling the selected designations in the group.

With the above processing, the transmission processing of the question message data from the paging receiver 1Z to the paging receivers 1A, 1B, and 1D is completed.

If the paging receiver 1Z determines in step C3 that formation of a normal message which expects no answer from the reception side is designated, the paging receiver 1Z prepares a message in accordance with an operation performed by the user (step C4), and sets the message in the output buffer 251 (step C5). Thereafter, the user depresses the dial transmission key 17 of the paging receiver 1Z while keeping the loudspeaker 18 in contact with the transmitter of the telephone terminal 2 such as a push-phone as shown in FIG. 2 (step C6). With this operation, the paging receiver 1Z converts call numbers for calling paging receivers as destinations and the prepared normal message data into a DTMF signal, and outputs/transmits the signal (step C7).

If the paging receiver 1Z determines in step C14 in accordance with a designation operation performed by the user that the destinations of the question message are based on the group address data, and the message is to be transmitted to all the paging receivers in the group, the paging receiver 1Z sets a group call number corresponding to the group address data for calling all the paging receivers, in which the group address is registered, in the output buffer 251 (step C15). The user then depresses the dial transmission key 17 of the paging receiver 1Z while keeping the loudspeaker 18 in contact with the transmitter of the telephone terminal 2 such as a push-phone as shown in FIG. 2

(step C16). With this operation, the paging receiver 1Z outputs/transmits the group call number and the prepared question message data as a DTMF signal (step C17).

In this case, the contents of the actually transmitted DTMF signal include the group call number for calling all the paging receivers in the group and the question message.

Figure 30:
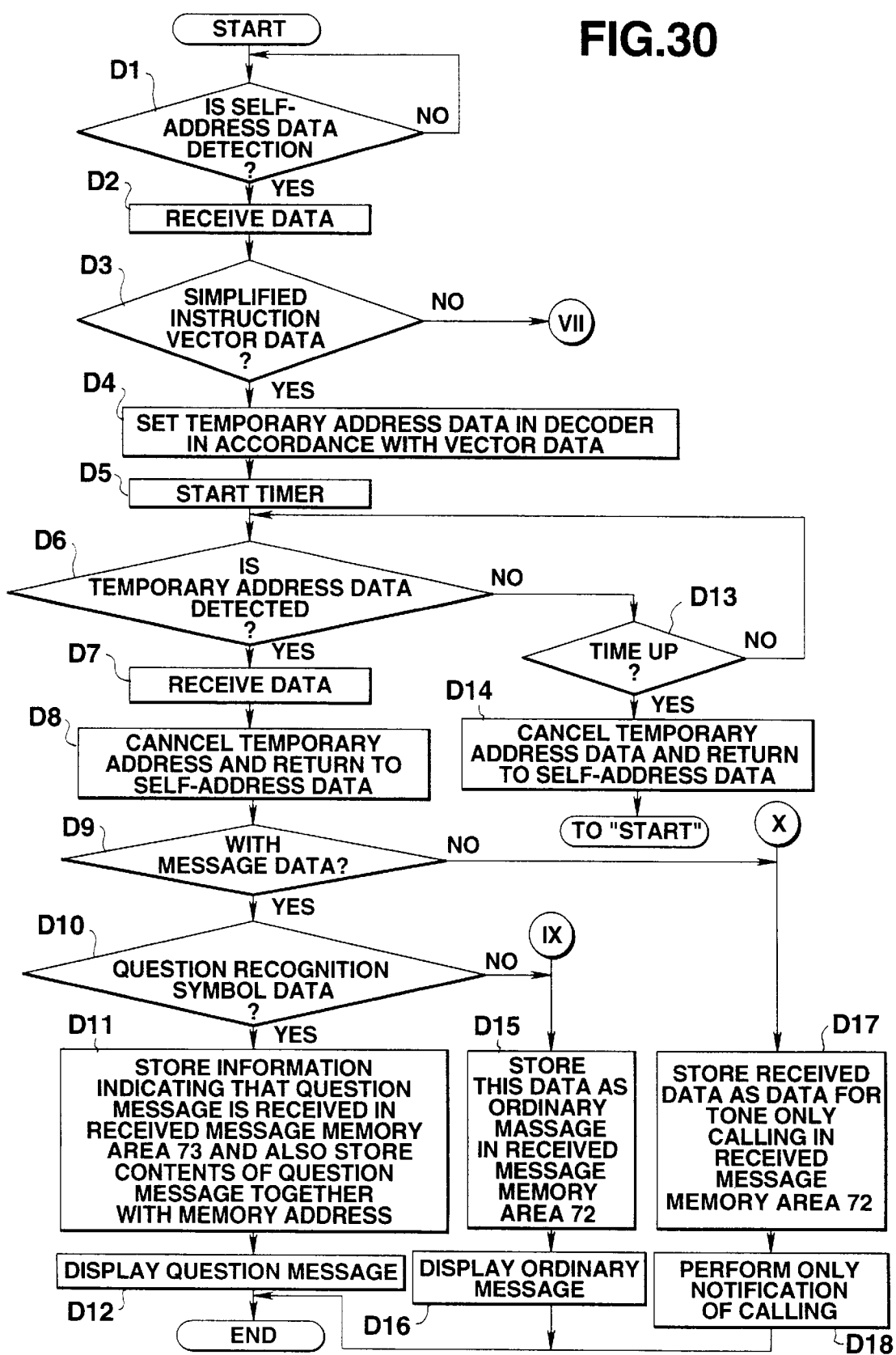
FIG. 30 is a flow chart showing the contents of terminating processing according to the second embodiment.
Figure 31:
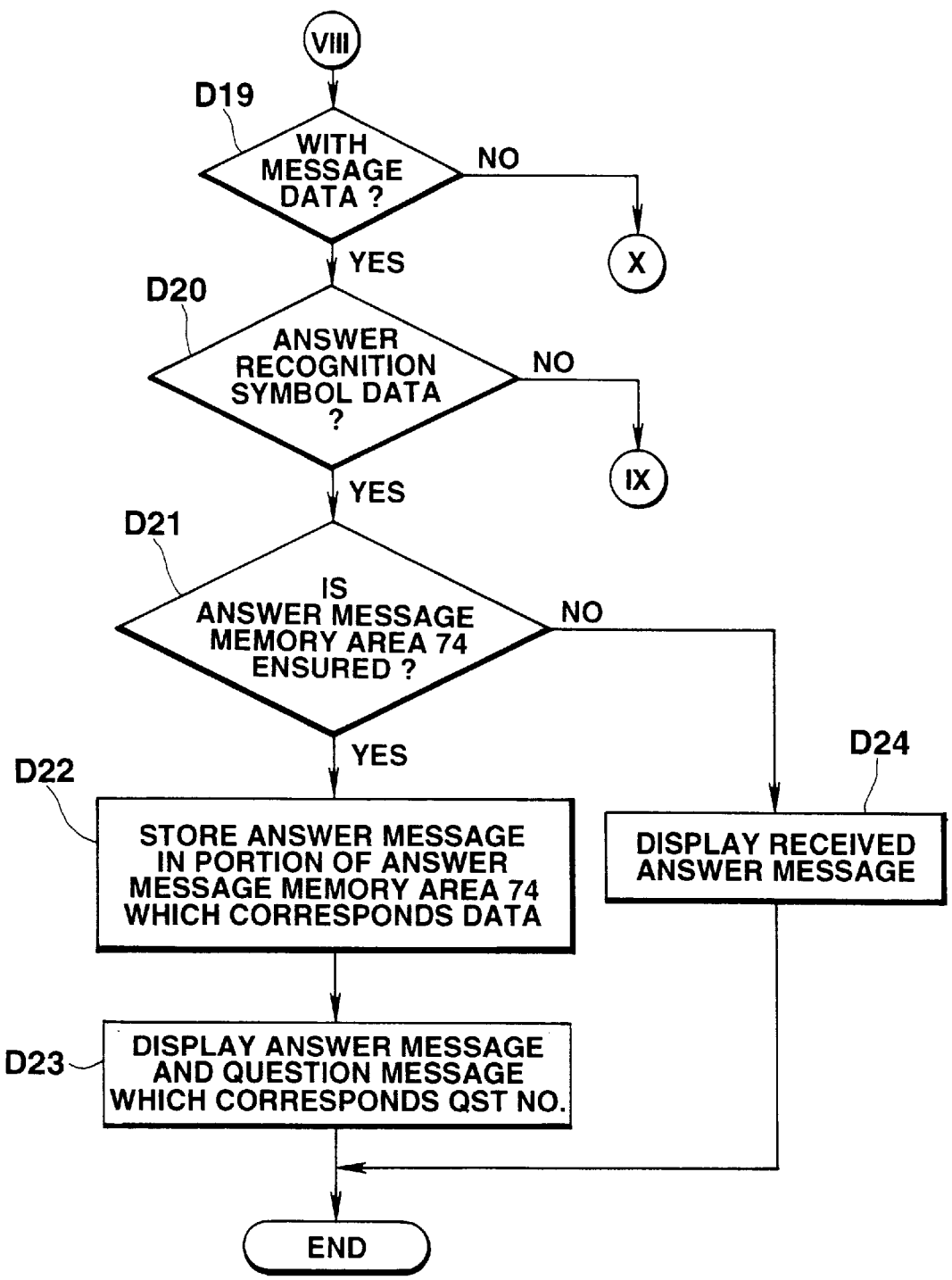
FIG. 31 is a flow chart showing the contents of terminating processing according to the second embodiment.

Question message terminating processing performed by the paging receivers 1A, 1B, and 1D will be described next with reference to the flow charts in FIGS. 30 and 31.

In this processing, each of the above paging receivers intermittently and repeatedly waits for detection of the self-address stored in the ID-ROM 23 upon a calling operation (step D1). When called, the paging receiver receives data following the self-address data (step D2).

The paging receiver then checks whether the received data includes simplified instruction vector data (step D3).

If it is determined that the received data includes the simplified instruction vector data, a control section 25 decodes temporary address data designated by this simplified instruction vector data and frame number data with which the temporary address data is transmitted, and writes/sets the set temporary address data and the frame number data with which the temporary address data is transmitted in the address and frame registers (not shown) of a decoder section 24 (step D4). The control section 25 then starts the internal timer (step D5).

The decoder section 24 repeatedly checks whether the set temporary address data is detected with the designated frame number, and whether the count value of the started timer has become a predetermined period of time, thereby waiting for detection of a calling operation using the temporary address data within the predetermined period of time (steps D6 and D13).

If it is determined in step D13 that the count value of the started timer has become the predetermined period of time without detection of a calling operation using the temporary address data, it is determined that termination of this temporary address data is not detected. The paging receiver then cancels the temporary address data and the frame number data set in the decoder section 24, and is automatically returned to the normal calling standby state based on the self-address data and the self-frame number (step D14).

If the temporary address data set in step D6 is detected with the decoded frame number within the predetermined period of time, the paging receiver receives data following the temporary address data (step D7), cancels the temporary address data set in the decoder section 24, and is automatically returned to the standby state for the reception of the self-address data and the self-frame (step D8).

It is then checked whether the data received in step D7 includes message data (step D9).

If it is determined that the received data includes no message data, it is determined that only a calling operation has been performed. The paging receiver stores the termination date data in the received message memory area 32 of the RAM 29 together with an address (step D17). Thereafter, the paging receiver notifies the calling operation by using of the following set means: an alarm sound produced by the loudspeaker 18, flickering of an LED lamp 14, and vibrations produced by a vibrator 30 (step D18).

It is determined that the data received in step D9 includes message data, it is then checked whether the message data includes question recognition symbol data, i.e., the message data is a question message (step D10).

It is determined that the message data includes no question recognition symbol data, since the message data is not a question message but is a normal message, the contents of the message and the termination date data are stored in the received message memory area 32 of the RAM 29 together with the address (step D15). Thereafter, the paging receiver notifies the calling operation by using of the following set means: an alarm sound produced by the loudspeaker 18, flickering of the LED lamp 14, and vibrations produced by the vibrator 30, and causes the liquid crystal display panel 13 to display the terminated normal message (step D16).

If it is determined in step D10 that the message data includes question recognition symbol data, it indicates that the message data is a question message. The paging receiver therefore stores the question message and the termination date data in the received message memory area 72 of the RAM 29 together with an address, and also stores the contents of the question message in the received message memory area 73 together with the address number, the subscriber ID number, and the question number in the received message memory area 72 (step D11).

FIG. 25 shows the terminated question message memory area 73 in which a plurality of question message contents are stored in this manner. As described above, the terminated question message memory area 73 is designed to store a plurality of sets of data, each including an address 81, a subscriber ID number 82, question message contents 83, and choice contents 88. The address 81 indicates an address number in the received message memory area 72 which corresponds to the question message.

The subscriber ID number 82 is the subscriber ID number of the subscriber who has transmitted this question message, and this ID number is added to the question message. The subscriber who has transmitted the question message can be known by searching the call number bank memory area 31 with this subscriber ID number.

After the question message is stored in the terminated question message memory area 73 in this manner, the paging receiver notifies the calling operation by using of the following set means: an alarm sound produced by the loudspeaker 18, flickering of the LED lamp 14, and vibrations produced by the vibrator 30, and also causes the liquid crystal display panel 13 to display the question message by using the question message data stored in the terminated question message memory area 73 (step D12).

Each of the paging receivers 1A, 1B, and 1D, which has received the question message from the paging receiver 1Z, performs this display operation. The above description is associated with transmission and reception of a question message within the group. Of these paging receivers 1A, 1B, and 1D, the paging receivers 1A and 1B prepare answer messages and transmit them to the paging receiver 1Z, and the paging receiver 1Z terminates these answer messages and performs totalization processing on the basis of the contents of the answer messages. This operation will be described below.

In each of the paging receivers 1A and 1B, when the user selects/designates, from the displayed state in FIG. 18, to return the answer message in the transmission processing shown in FIGS. 27 to 29, this selection/designation is determined (steps C1 to C3). Each paging receiver then searches the terminated question message memory area 73 of the RAM 29 (step C31) to check whether the terminated question message is stored (step C32).

If the question message is not stored, the information that the question message is not stored is displayed on the liquid crystal display panel 13 with characters like "QUESTION MESSAGE IS NOT TERMINATED" (step C39).

If the question message data is stored in the terminated question message memory area 73, it is checked whether a plurality of question message data are stored (step C33).

Figure 33:
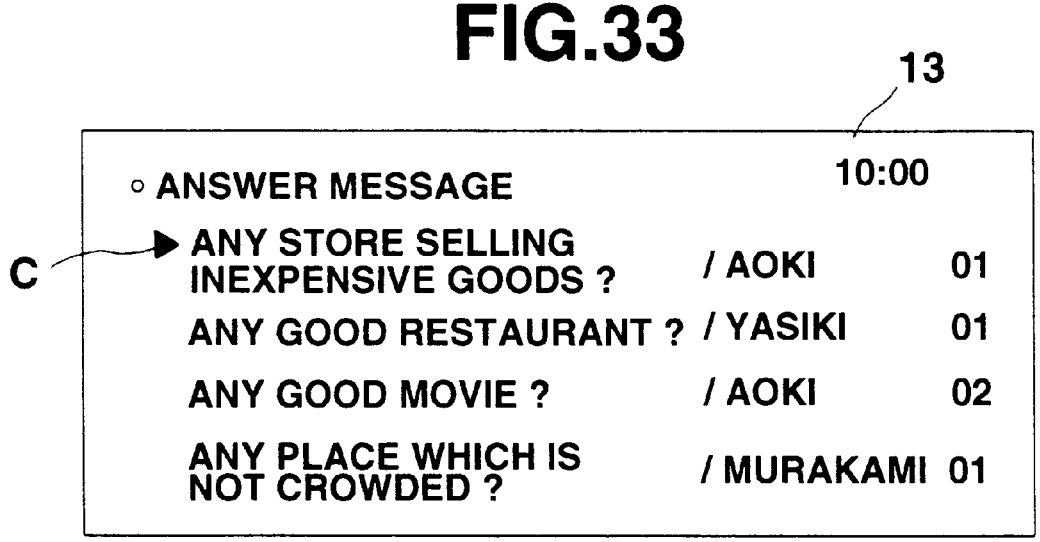
FIG. 33 is a view showing a display state in an operation according to the second embodiment.

If a plurality of question message data are stored, each paging receiver causes the liquid crystal display panel 13 to display a list of the contents of the question messages and sender names (subscriber names) obtained by searching the call number bank memory area 31 with the subscriber ID numbers, thereby designating selection of a question message, as shown in FIG. 33 (step C34). While displaying the selected question message on the liquid crystal display panel 13 in this manner, the user prepares an answer message (step C35). This message preparing operation is the same as the above question message preparing operation, and hence a description thereof will be omitted.

FIG. 34 shows a state wherein the formation of this answer message is completed. When a "register" key of the function keys 16 is operated upon completion of the preparing operation, the question message is confirmed.

When the answer message is prepared upon the designation operation performed by the user, the paging receiver 1Z searches the call number bank memory area 31 on the basis of the corresponding subscriber ID number in the terminated question message memory area 73. The paging receiver then sets flag "1", extracts the corresponding call number, and sets it in the output buffer 251 (step C36).

When the user depresses the dial transmission key 17 while keeping the loudspeaker 18 of the paging receiver 1B (1A) in contact with the transmitter of the telephone terminal 2 such as a push-phone (step C37), the paging receiver 1B (1A) converts the call number for calling the destination and the prepared answer message into a DTMF signal, and returns it to the paging receiver 1Z (step C38).

In this case, for example, the data configuration of the question message is "*8*41111*01xxxxxxxx". Of this data, "*8*4" at the first four digit positions is an answer recognition symbol; "1111" at the four succeeding digit positions, a subscriber ID number assigned to the paging receiver 1B as the sender of this answer message; "*01" at the next three digit positions, a question number; and "xxxxxxxx" at the last digit positions, a character code matrix (corresponding to four characters in this case) in which two digits represents one character, as shown in FIG. 5.

Finally, terminating processing to be performed when the paging receiver 1Z is to terminate answer messages from the paging receivers 1A, 1B, and 1D will be described.

The paging receiver 1Z intermittently and repeatedly waits for detection of the self-address data stored in the ID-ROM 23 upon a calling operation (step D1). When called, the paging receiver 1Z receives data following the self-address data (step D2).

The paging receiver 1Z checks whether the received data includes simplified instruction vector data (step D3). In this case, the paging receiver 1Z is to terminate the answer messages from the paging receivers 1A, 1B, and 1D, and there is no possibility that the answer messages to the question are returned to a plurality of paging receivers. It is therefore determined that no simplified instruction vector data for designating temporary address is terminated, and the flow does not advance to step D4. It is then checked whether the received data includes message data (step D19).

If it is determined that message data is included, it is checked whether the message data includes answer recognition symbol data, i.e., the message is an answer message (step D20).

If it is determined that the message data includes answer recognition symbol data, since it indicates that the message data is an answer message, the paging receiver 1Z checks whether a corresponding area is ensured in the answer message memory area 74 of the RAM 29 (step D21). Thereafter, the contents of the received answer message are stored in a portion of the answer message memory area 74 which corresponds to the question number and the subscriber ID number in the received answer message data (step D22).

The paging receiver 1Z reads out the answer message stored in the answer message memory area 74, together with the corresponding question message, and causes the liquid crystal display panel 13 to display them (step D23).

FIGS. 26A and 26B show how data are stored in the answer message memory area 74 of the RAM 29 of the paging receiver 1Z which receives answer messages from the paging receivers 1A, 1B, and 1D. In this case, a plurality of answer messages to a question message with question number "01" are stored, as shown in FIG. 26A, and a plurality of answer messages to a question message with question number "02" are stored, as shown in FIG. 26B.

FIG. 35 shows a plurality of answer messages displayed on the liquid crystal display panel 13 in accordance with the above state. In this case, the answer messages to the question message with question number "01" shown in FIG. 26A are displayed.

In this case, the names following the answer messages are obtained by searching the call number bank memory area 31 with the subscriber ID numbers in the answer message data stored in the answer message memory area 74.

In the first and second embodiments, each of the paging receivers 1 (1A to 1H and 1Z) serves as a transmission means having a so-called dialer, which converts prepared message data into a DTMF signal and outputs it to the telephone terminal 2. However, each paging receiver may serve as a transmission means having another device.

Figure 36:
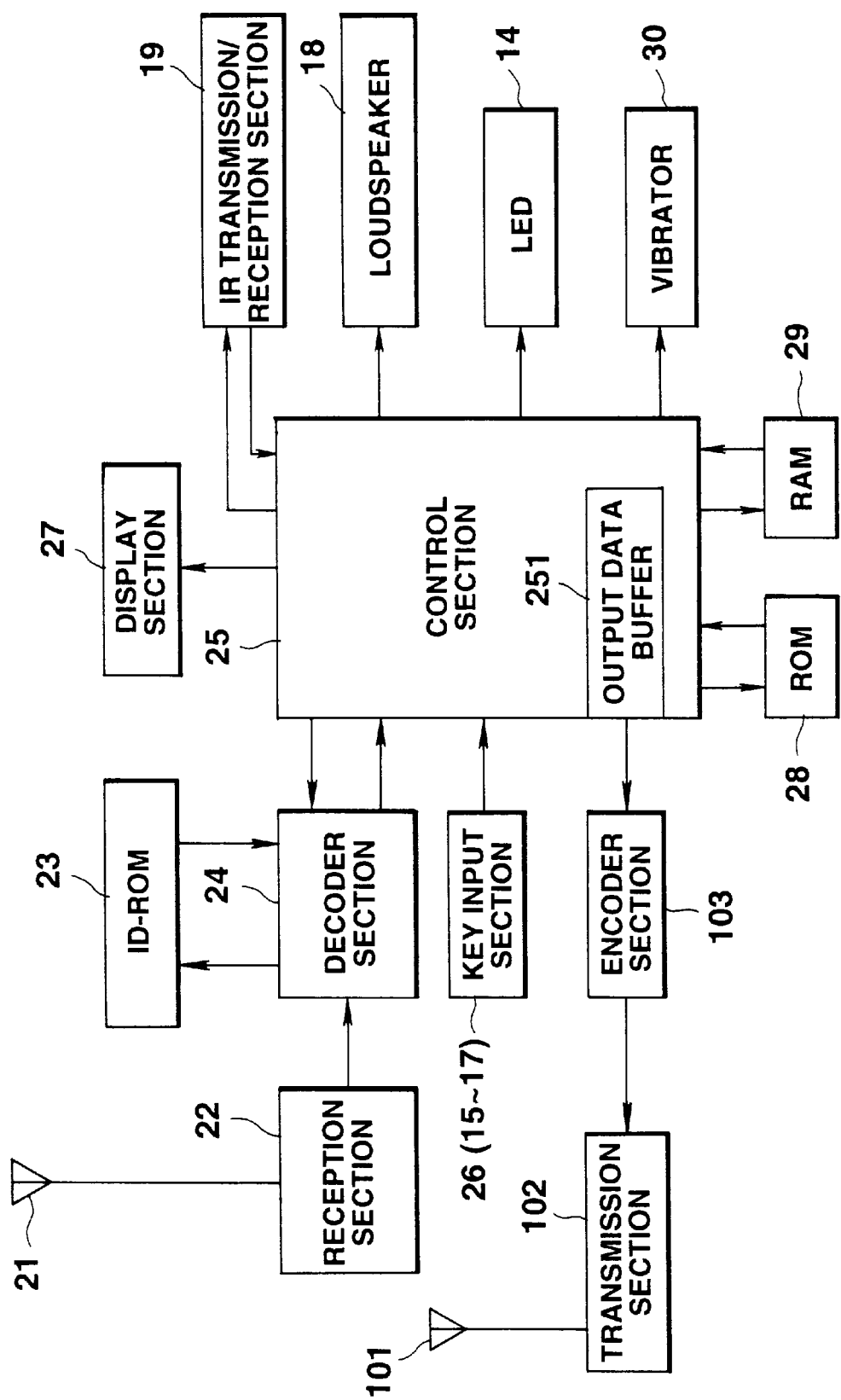
FIG. 36 is a block diagram showing the circuit arrangement of each of paging receivers 1 (1A to 1D and 1Z) used in still another embodiment of the present invention.
Figure 37:
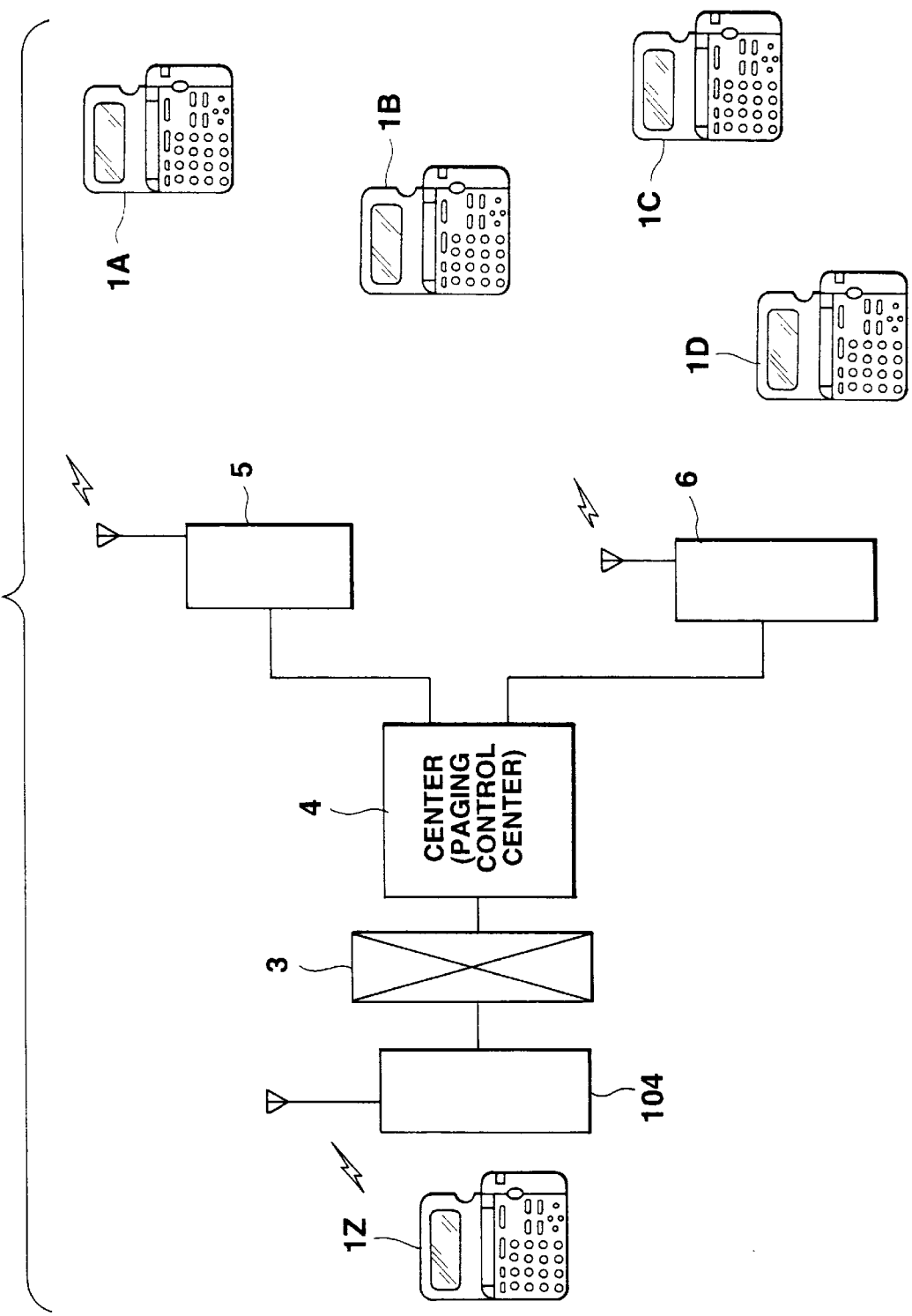
FIG. 37 is a view showing the arrangement of a paging system according to the embodiment shown in FIG. 36.

FIGS. 36 and 37 show paging receivers 1 (1A to 1D and 1Z) each serving as a transmission means having a radio transmission section (101 to 103) for directly outputting a prepared message by radio, and a manner of getting a paging service using the paging receivers 1. Referring to FIG. 37, a reception base station 104 is directly connected to a public telephone network 3 instead of a telephone terminal 2.

In calling the paging receiver 1A and transmitting a message thereto, the paging receiver 1Z stores the address data of the paging receiver 1A message data corresponding to a prepared message in an output buffer 251, frequency-modulates the data through an encoder section 103, and outputs the modulated data from a transmission antenna 101 through a transmission section 102.

The reception base station 104 receives this data and outputs it to a center 4 through the public telephone network 3. The subsequent processing is the same as that in the first and second embodiment.

The present invention is not limited to the first and second embodiments. Various changes and modifications can be made within the spirit and scope of the invention.

In addition, the present invention can be applied to various types of communication apparatuses having data communication functions, in addition to paging receivers. For example, the present invention can be applied to digital portable telephone sets, personal computers and electronic notebooks with communication functions, and communication apparatuses for performing communication using infrared rays and the like.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. A communication system comprising a plurality of communication terminals including a first communication terminal and at least one second communication terminal, each of said communication terminals including a display for displaying a message, and first transmission means for transmitting the message, said message being exchanged between said first communication terminal and said second communication terminal by radio;

wherein said first communication terminal comprises second transmission means for transmitting a message requesting an answer to said second communication terminal, and memory means for storing the message requesting an answer, said message requesting an answer including a substantive content in response to which a substantive answer which is responsive to the substantive content of the transmitted message, is required;

wherein said second communication terminal comprises:
first reception means for receiving the message requesting an answer;
first display control means for controlling the display of said second communication terminal to display the message requesting an answer;
forming means for forming an answer corresponding to the substantive content of the message requesting an answer; and
returning means for returning the answer corresponding to the substantive content of the message requesting an answer to said first communication terminal; and wherein said first communication terminal further comprises:
second reception means for receiving the answer corresponding to the substantive content of the message requesting an answer;
memory control means for storing the answer corresponding to the substantive content of the message requesting an answer in correspondence with the message requesting an answer in said memory means; and
second display control means for controlling the display of said first communication terminal to display the message requesting an answer and the answer.

2. The system according to claim 1,
wherein said first communication terminal further comprises information memory means for storing ID data and user information with respect to said second communication terminal in correspondence with each other;
wherein said returning means of said second communication terminal further returns the ID data together with the answer corresponding to the substantive content of the message requesting an answer;
wherein said second reception means of said first communication terminal further receives the ID data in addition to the answer; and
wherein said second display control means of said first communication terminal reads out user information from said user information memory means based on the received ID data, and controls said display of said first communication terminal to display the message requesting an answer and the answer in accordance with the user information read from said user information memory means.

3. The system according to claim 1, wherein said first communication terminal further comprises preparing means for preparing the message requesting an answer.

4. The system according to claim 1, wherein at least one of said first transmission means, said second transmission means and said returning means performs communication using a DTMF signal.

5. The system according to claim 1, wherein at least one of said first transmission means, said second transmission means and said returning means performs communication using a radio signal.

6. The system according to claim 1, wherein said memory means of said first communication terminal stores a plurality of predetermined messages requesting an answer, each message including a predetermined different substantive content which requires a substantive corresponding answer which is a function of the respective substantive content of the transmitted message requesting an answer.

7. A communication system comprising:
a plurality of communication terminals including a first communication terminal and at least one second communication terminal, each of said communication terminals including a display for displaying a message, and first transmission means for transmitting the message, said message being exchanged between said first communication terminal and paid second communication terminal by radio;

wherein said first communication terminal comprises second transmission means for transmitting a message requesting an answer to said second communication terminal, and memory means for storing the message requesting an answer, said message requesting an answer including a substantive content in response to which a substantive answer which is responsive to the substantive content of the transmitted message, is required;

wherein said second communication terminal comprises:
first reception means for receiving the message requesting an answer;
first display control means for controlling the display of said second communication terminal to display the message requesting an answer;
forming means for forming an answer corresponding to the substantive content of the message requesting an answer; and
returning means for returning the answer corresponding to the substantive content of the message requesting an answer to said first communication terminal; and wherein said first communication terminal further comprises:
second reception means for receiving the answer corresponding to the substantive content of the message requesting an answer;
memory control means for storing the answer corresponding to the substantive content of the message requesting an answer in correspondence with the message requesting an answer in said memory means; and
second display control means for controlling the display of said first communication terminal to display the message requesting an answer and the answer;

wherein said memory means of said first communication terminal stores a plurality of predetermined messages requesting an answer, each message including a substantive content, and message numbers corresponding respectively to said plurality of messages requesting an answer;

wherein said first transmission means of said first communication terminal transmits one of the messages requesting an answer together with the message number corresponding thereto to said second communication terminal;

wherein said first reception means of said second communication terminal receives the transmitted message requesting an answer together with the message number corresponding thereto;

wherein said returning means of said second communication terminal returns the message number together with the answer corresponding to the substantive content of the transmitted message; and wherein said memory control means of said first communication terminal further stores the message number in correspondence with the returned answer and the transmitted message requesting an answer in said memory means.

8. A communication terminal comprising:

transmission means for transmitting a message requesting an answer to at least one other communication terminal in a group to which said communication terminals belong, said message requesting an answer including a substantive content in response to which a substantive answer which is responsive to the substantive content of the transmitted message, is required;

memory means for storing the message requesting an answer;

reception means for receiving an answer returned from the other communication terminal, said answer being formed corresponding to the substantive content of the message requesting an answer;

memory control means for controlling said memory means to store the received answer corresponding to the substantive content of the message requesting an answer in correspondence with the message requesting an answer; and a display for displaying both the message requesting an answer and the answer corresponding to the substantive content of the message requesting an answer.

9. The communication terminal according to claim 8, wherein said reception means receives ID data corresponding to the other communication terminal together with the answer; and wherein said communication terminal further comprises:
user information memory means for storing the ID data and user information with respect to the other communication terminal in correspondence with each other;
second memory control means for controlling said memory means to store the received ID data in correspondence with the answer and the message requesting an answer; and
display control means for reading out user information from said user information memory means based on the received ID data, and for controlling said display to display the message requesting an answer and the received answer on said display means in accordance with the user information read from said user information memory means.

10. The communication terminal according to claim 8, further comprising preparing means for preparing the message requesting an answer.

11. The communication terminal according to claim 8, wherein said transmission means transmits the message requesting an answer by outputting a DTMF signal.

12. The communication terminal according to claim 8, wherein said transmission means transmits the message requesting an answer by outputting a radio signal.

13. The communication terminal according to claim 8, wherein said memory means stores a plurality of predetermined messages requesting an answer, each message including a predetermined different substantive content which requires a substantive corresponding answer which is a function of the respective substantive content of the transmitted message requesting an answer.

14. A communication terminal comprising:

transmission means for transmitting a message requesting an answer to at least one other communication terminal in a group to which said communication terminals belong, said message requesting an answer including a substantive content in response to which a substantive answer which is responsive to the substantive content of the transmitted message, is required;

memory means for storing the message requesting an answer;

reception means for receiving an answer returned from the other communication terminal, said answer being formed corresponding to the substantive content of the message requesting an answer;

memory control means for controlling said memory means is to store the received answer corresponding to the substantive content of the message requesting an answer in correspondence with the message requesting an answer; and a display for displaying the message requesting an answer and the answer corresponding to the substantive content of the massage requesting an answer;

wherein said memory means stores a plurality of messages requesting an answer, each including a substantive content, and message numbers corresponding to the plurality of messages requesting an answer;

said transmission means transmits one of the messages requesting an answer together with the message number corresponding thereto to the other communication terminal;

said reception means receives the message number together with the answer to the substantive content of the transmitted message; and said memory control means controls said memory to store the message number in correspondence with the received answer and the transmitted message requesting an answer.

* * * * *